(12) United States Patent
Ahn et al.

(10) Patent No.: US 9,574,109 B2
(45) Date of Patent: *Feb. 21, 2017

(54) SURFACE-MODIFIED HYDROGELS AND HYDROGEL MICROPARTICLES

(75) Inventors: Dongchan Ahn, Midland, MI (US); James Thompson, Sanford, MI (US)

(73) Assignee: Dow Corning Corporation, Midland, MI (US)

(*) Notice: Subject to any disclaimer, the term of this patent is extended or adjusted under 35 U.S.C. 154(b) by 11 days.

This patent is subject to a terminal disclaimer.

(21) Appl. No.: 13/579,011

(22) PCT Filed: Feb. 17, 2011

(86) PCT No.: PCT/US2011/025220
§ 371 (c)(1),
(2), (4) Date: Aug. 14, 2012

(87) PCT Pub. No.: WO2011/109174
PCT Pub. Date: Sep. 9, 2011

(65) Prior Publication Data
US 2012/0309623 A1    Dec. 6, 2012

Related U.S. Application Data

(60) Provisional application No. 61/305,863, filed on Feb. 18, 2010.

(51) Int. Cl.
| | | |
|---|---|---|
| *C08J 3/12* | (2006.01) | |
| *C08K 5/55* | (2006.01) | |
| *C08G 77/20* | (2006.01) | |
| *C09D 183/06* | (2006.01) | |
| *C08L 33/02* | (2006.01) | |
| *C09D 133/02* | (2006.01) | |
| *C09D 143/04* | (2006.01) | |

(52) U.S. Cl.
CPC .............. *C09D 183/06* (2013.01); *C08J 3/126* (2013.01); *C08L 33/02* (2013.01); *C09D 133/02* (2013.01); *C09D 143/04* (2013.01); *C08G 77/20* (2013.01); *C08J 2300/14* (2013.01); *C08J 2443/04* (2013.01); *C08K 5/55* (2013.01)

(58) Field of Classification Search
CPC ..... C08J 3/126; C08J 2300/14; C08J 2443/04; C08K 5/55; C08G 77/20
See application file for complete search history.

(56) References Cited

U.S. PATENT DOCUMENTS

| | | | |
|---|---|---|---|
| 4,122,029 A | 10/1978 | Gee et al. | 516/23 |
| 5,387,417 A | 2/1995 | Rentsch | 424/401 |
| 5,435,821 A * | 7/1995 | Duvdevani et al. | 71/28 |
| 5,539,019 A | 7/1996 | Suskind et al. | 523/201 |
| 5,549,590 A | 8/1996 | Suskind et al. | 604/368 |
| 5,731,365 A | 3/1998 | Engelhardt et al. | 523/206 |
| 5,760,116 A | 6/1998 | Kilgour et al. | 524/268 |
| 5,811,487 A | 9/1998 | Schulz, Jr. et al. | 524/862 |
| 5,840,321 A | 11/1998 | Engelhardt et al. | 424/402 |
| 5,849,816 A | 12/1998 | Suskind et al. | 523/201 |
| 5,888,491 A | 3/1999 | Mitra et al. | 424/78.31 |
| 6,706,831 B2 * | 3/2004 | Sonnenschein et al. | 526/196 |
| 6,770,708 B2 | 8/2004 | Kadlec et al. | 524/588 |
| 2008/0085983 A1 | 4/2008 | Ahn | 528/5 |

FOREIGN PATENT DOCUMENTS

| | | | |
|---|---|---|---|
| CN | 1887926 | 1/2007 | ............ C08F 2/44 |
| DE | 19801933 | 7/1999 | ............ B01J 20/26 |
| EP | 0195406 | 9/1986 | ............ C08F 8/42 |
| EP | 0705643 | 4/1996 | ............ A61L 15/26 |
| EP | 1258290 | 11/2002 | ............ A61K 8/891 |
| EP | 2536786 B1 | 12/2015 | |
| JP | H02-064160 | 3/1990 | ............ C08K 5/544 |
| JP | H04-292603 | 10/1992 | ............ C08F 2/32 |
| JP | 10120981 A | 5/1998 | ............ C09G 1/00 |
| JP | H115703 | 1/1999 | |
| JP | 2001-294512 | 10/2001 | ............ A61K 8/00 |
| JP | 2003034725 A | 2/2003 | |
| JP | 2003517009 A | 5/2003 | |

(Continued)

OTHER PUBLICATIONS

Kheirandish, S. et al., "Effect of Surface Polarity on Wettability and Friction Coefficient of Silicone Rubber/Poly (Acrylic Acid) Hydrogel Composite," Biomimetic Materials and Tissue Engineering Laboratories, Department of Chemical Engineering, Swearingen Engineering Center, University of South Carolina, Columbia, SC, USA. Colloid and Polymer Science (2006), 284(12), pp. 1411-1417. Publisher: Springer, CODEN: CPMSB6 ISSN: 0303-402X. Journal written in English. CAN 145:439171 AN 2006:851786 CAPLUS © 2008 ACS on SciFinder ®.

MacHotova, J. et al. "Effect of Functionalised Core-Shell Microgels Prepared by Emulsion Polymerisation on Acrylic Coatings Properties." Progress in Organic Coatings. vol. 63, No. 2, Sep. 2008 (pp. 175-181).

Yorimitsu, H. et al. "Chapter 1.2: Radical Chain Reactions: Organoborane Initiators." in: *Radicals in Organic Synthesis*. Wiley-VCH Verlag GmbH (Weinheim, Germany, Mar. 2008) doi: 10.1002/9783527618293.ch2 (pp. 11-27).

(Continued)

*Primary Examiner* — Bethany Barham
*Assistant Examiner* — Peter Anthopolos
(74) *Attorney, Agent, or Firm* — Scwegman Lundberg & Woessner, P.A.

(57) ABSTRACT

Provided in various embodiments are surface-modified hydrogels and hydrogel microparticles, methods for their preparation, and uses thereof for delivery of personal care and healthcare active ingredients, and agricultural active ingredients. In some embodiments, such hydrogels and hydrogel microparticles comprise surface coatings that are resistant to solvent washing and can act as barriers for the migration of water and/or water-compatible alcohols and actives soluble therein.

18 Claims, No Drawings

(56) References Cited

FOREIGN PATENT DOCUMENTS

| | | | | |
|---|---|---|---|---|
| JP | 2004089233 A | 3/2004 | | |
| JP | 2004300057 A | 10/2004 | ............... | A61K 8/00 |
| JP | 2008523196 A | 7/2008 | | |
| JP | 2008527077 A | 7/2008 | | |
| JP | 5860819 B2 | 2/2016 | | |
| WO | 99/15917 | 4/1999 | ............... | G02B 1/04 |
| WO | 00/71612 | 5/2000 | ............... | C08J 7/04 |
| WO | WO-01/44311 | 6/2001 | | |
| WO | WO-2006/062253 | 6/2006 | | |
| WO | 2006/073695 | 7/2006 | ................ | C08F 4/00 |
| WO | 2006/073696 | 7/2006 | ............ | C08F 230/06 |
| WO | WO-2006/073696 | 7/2006 | | |
| WO | 2006/082240 | 8/2006 | ............. | C08G 65/00 |
| WO | 2006/088571 | 8/2006 | ............ | C08F 220/18 |
| WO | 2007/149422 A3 | 2/2008 | ............ | C08L 83/04 |
| WO | 2008/073571 | 6/2008 | ............ | C08G 18/61 |
| WO | WO-2011/109174 | 9/2011 | | |

OTHER PUBLICATIONS

Yu, T. et al. "Methods for the Topographical Patterning and Patterned Surface Modification of Hydrogels Based on Hydroxyethyl Methacrylate." Biomacromolecules. vol. 4, No. 5, Sep. 2003 (pp. 1126-1131).

International Search Report and Written Opinion mailed Jun. 21, 2011 which issued in corresponding International Patent Application No. PCT/US2011/025220 (14 pages).

"Japanese Application Serial No. 2012-554020, Office Action mailed Oct. 28, 2014", 10 pgs.

"Chinese Application Serial No. 201180009946.9, Office Action mailed Jan. 7, 2015", w/ English Translation, 7 pgs.

"Chinese Application Serial No. 201180009946.9, Office Action mailed Mar. 18, 2014", (w/ English Translation), 8 pgs.

"Chinese Application Serial No. 201180009946.9, Response filed Mar. 23, 2015 to Office Action mailed Jan. 7, 2015", (w/ English Translation of Amended Claims), 14 pgs.

"Chinese Application Serial No. 201180009946.9, Response filed Sep. 2, 2014 to Office Action mailed Mar. 18, 2014", With English Claims in middle of document, 14 pgs.

"European Application Serial No. 11707256.1, Office Action mailed Nov. 11, 2013", 4 pgs.

"European Application Serial No. 11707256.1, Response filed Feb. 19, 2014 to Office Action mailed Nov. 11, 2013", 74 pgs.

"International Application Serial No. PCT/US2011/025220, International Preliminary Report on Patentability mailed Aug. 30, 2012", 9 pgs.

"Japanese Application Serial No. 2012-554020, Amendment filed Dec. 13, 2014", 5 pgs.

"Japanese Application Serial No. 2012-554020, Response filed Feb. 27, 2014 to Office Action mailed Oct. 28, 2014", (w/ English Translation of Claims), 13 pgs.

"Chinese Application Serial No. 261180099946.9, Office Action mailed Jul. 31, 2015", (w/ English Translation), 7 pgs.

"Japanese Application Serial No. 2012-554020, Office Action mailed Aug. 18, 2015", (w/ English Translation), 6 pgs.

* cited by examiner

SURFACE-MODIFIED HYDROGELS AND HYDROGEL MICROPARTICLES

CROSS-REFERENCE TO RELATED APPLICATIONS

This application is a U.S. National Stage of International Application No. PCT/US2011/025220, filed Feb. 17, 2011, which claims the benefit of U.S. Provisional Applications No. 61/305,863, filed Feb. 18, 2010, each of which is herby incorporated by reference herein in its entirety.

BACKGROUND

Hydrogels can be generally characterized as having a cross-linked polymer matrix (elastomer) component that swells when contacted with a sufficiently compatible fluid (generally, water and/or water-compatible compounds). Polymeric microparticles that have become swollen due to fluid trapped within the matrix are referred to as hydrogel microparticles. Since active ingredients and other compounds can be contained within the matrix, hydrogels and hydrogel microparticles (as well as pastes and powders made therefrom) have been found to be useful for the encapsulation and delivery of such compounds in a variety of applications. For example, hydrogels and hydrogel microparticles are particularly useful for encapsulation and delivery of pharmaceutical agents, vitamins, fragrances, oils, and other compounds in personal care and healthcare applications. In particular, hydrogels and hydrogel microparticles are useful for absorption and delivery of water-soluble and alcohol-soluble actives. However, such gels and microparticles may have limited resistance to pre-mature release of the actives contained therein when exposed to aqueous and/or alcohol systems.

Although various methods of preparing hydrogels, and hydrogel microparticles are known, there remains a need for methods of readily modifying hydrogels and hydrogel microparticles for use in a variety of applications. For example, there remains a need for methods of adapting a water-dispersible hydrogel or hydrogel microparticle to modulate the ingress or release of water from or to its environment.

SUMMARY

These needs are met by the present invention, which in various embodiments provides surface-modified microparticles and hydrogels, methods for their preparation, and uses thereof for delivery of personal care and healthcare active ingredients, as well as agricultural active ingredients.

According to some embodiments, surface-modified hydrogels and microparticles have surface coatings that resist solvent washing and can act as barriers (temporary or permanent) for the migration of water and/or water-compatible compounds. According to some embodiments, surface-modified hydrogels are prepared by methods comprising treating a hydrogel comprising at least one water-compatible organic polymer, alcohol-compatible organic polymer (wherein said alcohol is compatible with water), or combination thereof; said hydrogel being treated in the presence of oxygen with (i) at least one free-radical polymerizable compound that is immiscible with water, water-compatible alcohols, or combinations thereof; and (ii) at least one organoborane free radical initiator; wherein said treatment forms at least one modified surface on the hydrogel.

According to some embodiments, surface-modified microparticles (polymeric or gelled) are prepared by methods comprising treating microparticles comprising at least one water-compatible organic polymer, alcohol-compatible organic polymer, or combination thereof; said microparticle being treated in the presence of oxygen with (i) at least one free-radical polymerizable compound that is immiscible with water, water-compatible alcohols, or combinations thereof; and (ii) at least one organoborane free radical initiator; wherein said treatment forms at least one modified surface on the microparticle.

These and additional features and advantages of the invention will become apparent in the course of the following detailed description.

DETAILED DESCRIPTION

Features and advantages of the invention will now be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Unless otherwise specifically indicated, the term "water-compatible" as used in the specification and appended claims is intended to mean at least partially soluble in water, but when used to describe a cross-linked polymer, the term is intended to mean that the polymer is able to absorb water.

As used in the specification and appended claims, the term "hydrogel" is intended to refer to gels in which the cross-linked polymer matrix is fully or partially swollen with water, one or more water-compatible alcohols, or combinations thereof. Accordingly, the term also includes, but is not limited to, alcogels fully or partially swollen with a water-compatible alcohol. The crosslinking of the polymer matrix may be chemical or physical in nature. As non-limiting examples, the hydrogel may be crosslinked through covalent bonds, ionic interactions, hydrogen bonding, chain entanglement, or self-association of microphase segregating moieties. Additionally, it is to be understood that such hydrogels may exist and be used in a dehydrated (unswollen) state.

Unless otherwise specifically indicated, the term "hydrogel microparticle" as used in the specification and appended claims is intended to refer to both a polymeric microparticle and a polymeric microparticle that is swollen with a sufficiently compatible fluid.

As used in the specification and appended claims, the term "alcohol" is intended to refer to water-compatible alcohols. Accordingly, the term "alcohol-compatible organic polymer" is intended to refer to an organic polymer that is compatible with a water-compatible alcohol.

As used in the specification and appended claims, the term "hydrophobic" is intended to mean lacking an affinity for and/or being resistant to water and/or water-compatible compounds. Accordingly, the term also refers to lacking an affinity for and/or being resistant to water-compatible alcohols.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Water compatible polymers and hydrogels are useful for thickening, or gelling, water and/or alcohols, as well as materials that are compatible with water and/or alcohols. Hydrogels are used as carriers or dispersants for a variety of applications in which water or alcohol-soluble active ingredient are introduced to the surroundings. For controlled release applications where it is desirable to control the rate of delivery of the active ingredient to the surroundings, hydrogels prepared by known methods suffer from the limitation of not providing significant control of active diffusion rates. Further, many of the most common hydrogel materials, such as polyacrylic acid derivatives, tend to be difficult to handle both as dehydrated neat solids (due to fine particle size and extreme moisture sensitivity) and as partially or fully hydrated gels because of their tackiness. Hence, it is considered beneficial to provide a hydrophobic barrier to slow the diffusion of the active ingredients out of the hydrogel matrix into the surroundings and to improve handling characteristics.

In various embodiments, provided are hydrogels and hydrogel microparticles with hydrophobic surface coatings that act as barriers for the migration of water and water-compatible compounds, methods for their preparation, and uses thereof for delivery of personal care and healthcare, and agricultural active ingredients. In various embodiments, provided are methods of producing surface-modified hydrogels and hydrogel microparticles by inducing polymerization of coatings at or near the surface of the hydrogel or microparticle. In some embodiments, when the method is carried out on a monolithic hydrogel, a water or alcohol immiscible free radical compound is polymerized to form a hydrophobic coating over the exposed surfaces of the hydrogel. In some embodiments, when the provided methods are carried out with hydrogel microparticles, the result is the in situ formation of hydrogel microparticles surrounded by a hydrophobic shell. In either application, the coating formed modulates the transport rates of water and water-compatible components across the coating.

While not wishing to be bound by theory, it is believed that the provided methods localize the site of initiation of polymerization to the exposed surfaces or near-surface regions surrounding the hydrogel or microparticle surface, thereby resulting in selective coating of the surface to form a polymeric shell. In contrast to bulk modification methods such as co-polymerization or blending of a hydrogel with hydrophobic compounds, the provided methods retain the intrinsic properties of the hydrogel or microparticle core that are desirable for optimal loading of the active ingredient. For example, the methods provided herein allow for preparation of a water-containing hydrogel or microparticle that has a hydrophobic surface coating but that retains the hydrophilic properties that are desired for optimal loading of the active ingredient to the hydrogel or microparticle.

According to some embodiments, surface-modified hydrogels are prepared by methods comprising: treating a hydrogel comprising Component (A), at least one water-compatible organic polymer, alcohol-compatible organic polymer, or combination thereof, said hydrogel being treated in the presence of oxygen with (i) Component (B), at least one free-radical polymerizable compound that is immiscible with water, water-compatible alcohols, or combinations thereof; and (ii) Component (C), at least one organoborane free radical initiator; wherein at least one modified surface is formed on the treated hydrogel. In some embodiments, the untreated hydrogel optionally comprises and/or is optionally treated in the presence of Component (D), at least one absorbable solvent selected from water, alcohols, and combinations thereof. In some embodiments, the untreated hydrogel or surface-modified hydrogel optionally comprises or is optionally treated with one or more of Component (E), at least one organonitrogen-reactive compound; Component (F), at least one personal care or healthcare active ingredient, or at least one agricultural active ingredient; or Component (G), at least one surfactant.

According to some embodiments, surface-modified hydrogel microparticles are prepared by methods comprising: treating a hydrogel microparticle comprising Component (A), said hydrogel microparticle being treated in the presence of oxygen with (i) Component (B); and (ii) Component (C); wherein at least one modified surface is formed on the treated hydrogel microparticle. In some embodiments, the untreated hydrogel microparticle optionally comprises and/or is optionally treated with Component (D). In some embodiments, the untreated hydrogel microparticle or surface-modified hydrogel microparticle optionally comprises or is optionally treated with one or more of Component (E); Component (F); or Component (G).

Hydrogels and Hydrogel Microparticles

According to various embodiments, provided are methods of modifying surfaces of hydrogels and hydrogel microparticles. Known hydrogels and hydrogel microparticles may be surface modified by the provided methods. Additionally, methods of preparing the unmodified hydrogels and hydrogel microparticles are also known and vary depending upon their nature and use. While good results have been obtained with the use of Carbopol® polyacrylic acid gels and microparticles, one of skill in the art will appreciate that the methods and compositions described herein are not limited to such gels and microparticles.

In some embodiments, hydrogel microparticles used for the provided methods may have any shape (i.e., spherical or irregular) or size. The microparticles used may be formed directly or from the shearing or pulverizing of a gel monolith. Non-limiting examples of suitably sized microparticles include those having an average particle size of from about 0.1 μm to about 100 μm.

Component (A), Organic Polymer

In the preparation of both surface-modified hydrogels and hydrogel microparticles, Component (A) is selected from at least one water-compatible organic polymer, alcohol-compatible organic polymer, and combinations thereof. The polymer may be homopolymeric, heteropolymeric (including, but not limited to, cross-polymers or co-polymers of any co-monomer distribution), and may be linear, branched, hyperbranched, dendrimeric, or crosslinked to any extent. Examples of suitable polymers include, but are not limited to, gelatin, methylcellulose, hydroxyethyl methyl cellulose, hydroxypropyl methyl cellulose, polyethylene oxide, polyacrylamides, polyacrylic acid, polymethacrylic acid, salts of polyacrylic acid, salts of polymethacrylic acid, poly(2-hydroxyethyl methacrylate), polylactic acid, polyglycolic acid, polyvinylalcohol, polyanhydrides such as poly(methacrylic) anhydride, poly(acrylic) anhydride, polysebasic anhydride, collagen, poly(hyaluronic acid), hyaluronic acid-containing polymers and copolymers, polypeptides, dextran, dextran sulfate, chitosan, chitin, agarose gels, fibrin gels, soy-derived hydrogels and alginate-based hydrogels such as poly(sodium alginate), and combinations thereof.

In some embodiments, Component (A) may be selected from polyacrylic acid, poly(meth)acrylic acid, salts of polyacrylic acid, salts of poly(methacrylic acid), poly(meth-acrylic) anhydride, and poly(acrylic) anhydride. Good results have been obtained with polyacrylic acid, gelatin, methyl cellulose, Carbopol® ETD 2020, Carbopol® Ultrez 20, and Carbopol® ETD 2050.

Component (B), Free-Radical Polymerizable Compound

In the preparation of both surface-modified hydrogels and hydrogel microparticles, Component (B) is selected from at least one free-radical polymerizable compound that is immiscible with water, water-compatible alcohols, or combinations thereof. In some embodiments, free-radical polymerizable compounds may be organic monomers, oligomers, and polymers; organopolysiloxanes; and combinations thereof.

In some embodiments, Component (B) may comprise at least one free-radical polymerizable organic compound. Suitable examples of such compounds include, but are not limited to, methylacrylate, methylmethacrylate, neopentyl glycol diacrylate, neopentyl glycol dimethacrylate, glycidyl acrylate, glycidyl methacrylate, allyl acrylate, allyl methacrylate, strearyl acrylate, tetrahydrofuryl methacrylate, caprolactone acrylate, perfluorobutyl acrylate, perfluorobutyl methacrylate, 1H, 1H, 2H, 2H-heptadecafluorodecyl acrylate, 1H, 1H, 2H, 2H-heptadecafluorodecyl methacrylate, tetrahydroperfluoro acrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, diethylene glycol diacrylate, diethylene glycol dimethacrylate, dipropylene glycol diacrylate, dipropylene glycol dimethacrylate, polyethylene glycol diacrylate, polyethylene glycol dimethacrylate, polypropylene glycol methacrylate, polypropylene glycol diacrylate, polypropylene glycol dimethacrylate, propylene glycol monomethacrylate, ethylene glycol mono-methacrylate, N-isopropyl acrylamide, trimethylolpropane triacrylate, trimethylolpropane trimethacrylate, ethoxylated trimethylolpropane triacrylate, ethoxylated trimethylolpropane trimethacrylate, pentaerythritol triacrylate, pentaerythritol trimethacrylate, pentaerythritol tetraacrylate, pentaerythritol tetramethacrylate, methyl-3-butenoate, allyl methyl carbonate, diallyl pyrocarbonate, allyl acetoacetate, diallyl carbonate, diallyl phthalate, dimethyl itaconate, diallyl carbonate, or combinations thereof. Other useful organic compounds include (meth)acrylate tipped polyurethane prepolymers prepared by reacting isocyanate reactive acrylate monomers, oligomers or polymers such as hydroxy acrylates with isocyanate functional prepolymers, (meth)acrylate tipped rubbery oligomers and polymers such as acrylate- or methacrylate-tipped polyisobutylenes, and (meth)acrylate functionalized natural oil derivatives such as acrylate- or methacrylate-functionalized soybean oil.

In some embodiments, Component (B) may comprise at least one free-radical polymerizable organopolysiloxane. Suitable compounds include organopolysiloxanes having free radical polymerizable moieties, wherein the organopolysiloxanes can be polymeric or a mixture of oligomers and polymers, and wherein polymeric organopolysiloxanes can either be homopolymeric or heteropolymeric. In addition, suitable organopolysiloxanes can be linear, branched, hyperbranched, or resinous in structure. In some embodiments, Component (B) comprises organopolysiloxanes having at least two free radical polymerizable moieties per molecule, wherein such moieties are monofunctional, multifunctional, or a combination thereof. Thus, Component (B) can be a mixture of organopolysiloxanes differing in their degree of functionality and/or the nature of the free radical polymerizable moieties. The organopolysiloxanes of Component (B) can also vary in consistency from a fluid to a gum. For example, the organopolysiloxane can be a fluid, a solid, or a solid that becomes flowable at an elevated temperature or by the application of shear. In some embodiments, the organopolysiloxanes have a viscosity of from about 1 cP to about 5,000,000 cP at 25° C.; alternatively, from about 50 cP to about 500,000 cP at 25° C.; alternatively, from about 100 cP to about 100,000 cP at 25° C.

The organopolysiloxanes of Component (B) may also have a glass transition temperature or, upon polymerization or crosslinking, form particles that have a glass transition temperature, wherein the resulting silicone composition undergoes marked changes in its viscosity under the temperatures of use. Such compositions are particularly useful for encapsulation of active ingredients that are released by the introduction of heat.

In some embodiments, Component (B) may comprise free radical polymerizable organopolysiloxanes having formulae selected from:

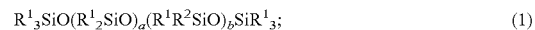

$$R^1{}_3SiO(R^1{}_2SiO)_a(R^1R^2SiO)_bSiR^1{}_3; \quad (1)$$

wherein a has a value of zero to 20,000 and b has a value of 1 to 20,000; and wherein each $R^1$ group is independently a hydrogen, halogen, or a monovalent organic group, and each $R^2$ group is independently a monovalent unsaturated organic group; and

$$R^3{}_2R^4SiO(R^3{}_2SiO)_c(R^3R^4SiO)_dSiR^3{}_2R^4; \quad (2)$$

wherein c has a value of zero to 20,000, and d has a value of zero to 20,000; and wherein each $R^3$ is independently a hydrogen, halogen, or a monovalent organic group, and each $R^4$ group is independently a monovalent unsaturated organic group.

Suitable $R^1$ and $R^3$ groups include, but are not limited to, hydrogen; organic groups (linear and/or branched) such as alkyl groups, haloalkyl groups, alkenyl groups, alkynyl groups, acrylate functional groups, and methacrylate functional groups; and other organic functional groups such as glycidyl groups, amine groups, ether groups, cyanate ester groups, isocyano groups, ester groups, carboxylic acid groups, carboxylate salt groups, succinate groups, anhydride groups, mercapto groups, sulfide groups, azide groups, phosphonate groups, phosphine groups, masked isocyano groups, and hydroxyl groups. Examples of such groups include, but are not limited to, acrylic functional groups such as acryloyloxypropyl groups and methacryloyloxypropyl groups; alkyl groups such as methyl, ethyl, propyl, isopropyl, n-butyl, s-butyl, and t-butyl groups; alkenyl groups such as vinyl, allyl, and butenyl groups; alkynyl groups such as ethynyl and propynyl groups; aromatic groups such as phenyl, tolyl, and xylyl groups; cyanoalkyl groups such as cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups; alkenyloxypoly(oxyalkyene) groups such as allyloxy(polyoxyethylene), allyloxypoly(oxypropylene), and allyloxy-poly(oxy-propylene)-co-poly(oxyethylene) groups; alkyloxypoly(oxyalkyene) groups such as propyloxy(polyoxyethylene), propyloxypoly(oxypropylene), and propyloxy-poly(oxypropylene)-co-poly(oxyethylene) groups; halogen substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; aminoalkyl groups such as 3-aminopropyl, 6-aminohexyl, 1 1-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; epoxyalkyl groups such as 3-glycidoxypropyl, 2-(3,4,-epoxycyclohexyl)ethyl, and 5,6-epoxyhexyl groups; ester functional groups such as actetoxyethyl and benzoyloxypropyl groups; hydroxy functional groups such as hydroxy and 2-hydroxyethyl groups; isocyanate and masked isocyanate functional groups such as 3-isocyanatopropyl, tris-3-propylisocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carboxylic acid functional groups such as 3-carboxypropyl and 2-carboxyethyl groups; and metal salts of carboxylic acids such as the zinc, sodium, or potassium salts of 3-carboxypropyl and 2-carboxyethyl.

Suitable $R^2$ and $R^4$ groups include, but are not limited to, monovalent alkenyl and alkynyl groups having 2-12 carbon atoms groups such as vinyl, allyl, butenyl, ethynyl, and propynyl groups; alkenyloxypoly(oxyalkyene) groups such as allyloxy(polyoxyethylene), allyloxypoly(oxypropylene), and allyloxy-poly(oxypropylene)-co-poly(oxyethylene) groups; acrylic functional groups such as acryloyloxypropyl and methacryloyloxypropyl groups; and halogen-substituted analogs thereof. In certain embodiments, $R^2$ and $R^4$ are selected from acrylate groups and methacrylate groups.

Some representative examples of Component (B) include, but are not limited to, methacryloxypropyldimethylsiloxy-terminated polydimethylsiloxane; acryloxypropyldimethyl-siloxy-terminated polydimethylsiloxane, 1,3-bis(methacryloxypropyl)tetramethyldisiloxane, 1,3-bis(acryloxypropyl)tetramethyldisiloxane, 1,3-bis(methacryloxymethyl)tetramethyldisiloxane, 1,3-bis (acryloxymethyl) tetramethyldisiloxane, α,ω,-methacryloxymethyldimethylsilyl terminated polydimethylsiloxane, methacryloxypropyl-terminated polydimethylsiloxane, α, ω-acryloxymethyldimethylsilyl terminated polydimethylsiloxane, methacryloxypropyldimethylsilyl terminated polydimethylsiloxane, α, ω-acryloxypropyldimethylsilyl terminated polydimethylsiloxane, pendant acrylate and methacrylate functional polymers such as poly(acryloxypropyl-methylsiloxy) polydimethylsiloxane and poly(methacryloxypropyl-methylsiloxy) polydimethylsiloxane copolymers, telechelic polydimethylsiloxanes having multiple acrylate or methacrylate functional groups including those formed via a Michael addition reaction of multi-acrylate or multi-methacrylate monomers to amine-terminated polydimethylsiloxanes, and combinations thereof. Also suitable for use as free radical polymerizable organosilicon compounds include monofunctional acrylate or methacrylate terminated organopolysiloxanes such as polydimethylsiloxane terminated at one end by a methacryloxypropyldimethylsilyl group and terminated at the other end by n-butyldimethylsilyl groups.

In some embodiments, Component (B) may comprise siloxane resins having structural units of organopolysiloxanes independently selected from:

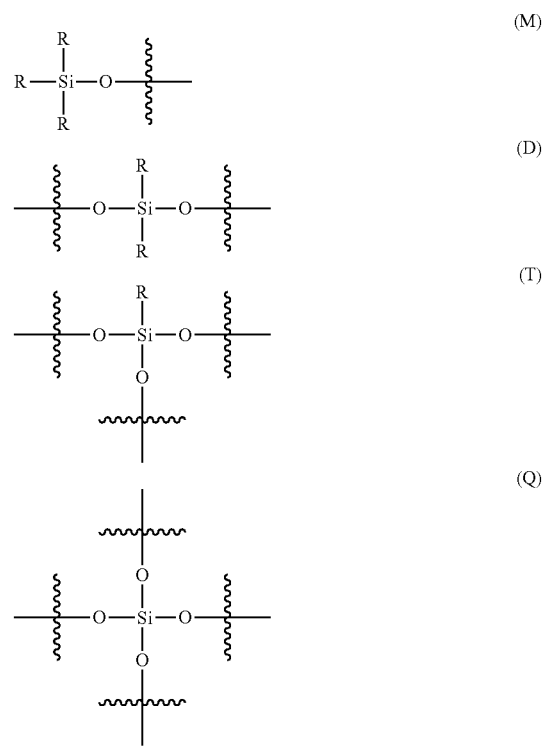

wherein M represents a monofunctional unit $R_3SiO_{1/2}$; D represents a difunctional unit $R_2SiO_{2/2}$; T represents a trifunctional unit $RSiO_{3/2}$; and Q represents a tetrafunctional unit $SiO_{4/2}$.

In some embodiments, Component (B) may comprise a siloxane resin selected from MQ resins having $R^5_3SiO_{1/2}$ units and $SiO_{4/2}$ units; TD resins having $R^5SiO_{3/2}$ units and $R^5_2SiO_{2/2}$ units; MT resins having $R^5_3SiO_{1/2}$ units and $R^5SiO_{3/2}$ units; MTD resins having $R^5_3SiO_{1/2}$ units, $R^5SiO_{3/2}$ units, and $R^5_2SiO_{2/2}$ units, and combinations thereof; wherein each $R^5$ group is independently a monovalent organic group having from 1-20 carbon atoms. In some embodiments, $R^5$ has from 1-10 carbon atoms. In some embodiments, at least one $R^5$ group is a free radical polymerizable unsaturated organic group.

Suitable examples of $R^5$ include, but are not limited to, acrylate functional groups such as acryloxyalkyl groups; methacrylate functional groups such as methacryloxyalkyl groups; cyanofunctional groups; monovalent hydrocarbon groups; and combinations thereof. The monovalent hydrocarbon groups may include alkyl groups such as methyl, ethyl, propyl, isopropyl, n-butyl, s-butyl, t-butyl, pentyl, neopentyl, octyl, undecyl, and octadecyl groups; cycloalkyl groups such as cyclohexyl groups; alkenyl groups such as vinyl, allyl, butenyl, and hexenyl groups; alkynyl groups such as ethynyl, propynyl, and butyryl groups; aryl groups such as phenyl, tolyl, xylyl, benzyl, and 2-phenylethyl groups; halogenated hydrocarbon groups such as 3,3,3- trifluoropropyl, 3-chlorophenyl, dichlorophenyl, and 6,6,6,5,5,4,4,3,3-nonafluorohexyl groups; and combinations thereof. The cyano-functional groups may include cyanoalkyl groups such as cyanoethyl and cyanopropyl groups, and combinations thereof.

$R^5$ may also include alkyloxypoly(oxyalkyene) groups such as propyloxy(polyoxyethylene), propyloxypoly(oxypropylene) and propyloxy-poly(oxypropylene)-co-poly(oxyethylene) groups, halogen substituted alkyloxypoly(oxyalkyene) groups such as perfluoropropyloxy(polyoxyethylene), perfluoropropyloxypoly(oxypropylene) and perfluoropropyloxy-poly(oxypropylene) copoly(oxyethylene) groups, alkenyloxypoly(oxyalkyene) groups such as allyloxypoly(oxyethylene), allyloxypoly(oxypropylene) and allyloxy-poly(oxypropylene) copoly(oxyethylene) groups, alkoxy groups such as methoxy, ethoxy, n-propoxy, isopropoxy, n-butoxy and ethylhexyloxy groups, aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups, hindered aminoalkyl groups such as tetramethylpiperidinyl oxypropyl groups, epoxyalkyl groups such as 3-glycidoxypropyl, 2-(3,4,-epoxycyclohexyl)ethyl, and 5,6-epoxyhexyl groups, ester functional groups such as acetoxymethyl and benzoyloxypropyl groups, hydroxyl functional groups such as hydroxy and 2-hydroxyethyl groups, isocyanate and masked isocyanate functional groups such as 3-isocyanatopropyl, tris-3-propylisocyanurate, propyl-t-butylcarbamate, and propyl-ethylcarbamate groups, aldehyde functional groups such as undecanal and butyraldehyde groups, anhydride functional groups such as 3-propyl succinic anhydride and 3-propyl maleic anhydride groups, carboxylic acid functional groups such as 3-carboxypropyl, 2-carboxyethyl, and 10-carboxydecyl groups, metal salts of carboxylic acids such as zinc, sodium, and potassium salts of 3-carboxypropyl and 2-carboxyethyl groups, and combinations thereof.

Some specific examples of suitable siloxane resins that can be used as haciyloxymethy Component (B) include, but are not limited to, $M^{Methacryloxymethyl}Q$ resins; $m^{Methacryloxypropyl}Q$ resins; $MT^{Methacryloxymethyl}T$ resins; $MT^{Methacryloxypropyl}T$ resins; $MDT^{Methacryloxymethyl}T^{Phenyl}T$ resins; $MDT^{Methacryloxypropyl}T^{Phenyl}T$ resins; $M^{Vinyl}T^{Phenyl}$ resins; $TT^{Methacryloxymethyl}$ resins; $TT^{Methacryloxypropyl}$ resins; $T^{Phenyl}T^{Methacryloxymethyl}$ resins; $T^{Phenyl}T^{Methacryloxypropyl}$ resins; $TT^{Phenyl}T^{Methactyloxymethyl}$ resins; $TT^{Phenyl}T^{MethacryloxyPropyl}$ resins; and combinations thereof.

Siloxane resins may be prepared by any method known in the art. In some embodiments, the resin is made by treating a resin copolymer produced by a silica hydrosol capping process with an alkenyl including endblocking reagent. This preferably includes reacting a silica hydrosol under acidic conditions with a hydrolyzable triorganosilane such as trimethylchlorosilane, a siloxane such as hexamethyldisiloxane, and combinations thereof, and then recovering a copolymer having M and Q groups including 2 to 5% wt of hydroxyl groups. The copolymer may be reacted with an endblocking agent including unsaturated organic groups and an endblocking agent free of aliphatic unsaturation in amounts sufficient to provide 3 to 30 mole percent of unsaturated organofunctional M, D or T groups in the resin relative to the sum of all M, D, T and Q units comprising the resin. Suitable endblocking agents include silazanes, siloxanes, silanes, and combinations thereof.

In some embodiments, Component (B) is selected from acrylate and methacrylate-functional polydimethylsiloxanes, silanes and resins, acryloxyalkyl-alkoxysilanes (mono-,di- and tri-alkoxy), methacryloxyalkyl-alkoxysilanes (mono-,di- and tri-alkoxy), methacryloxypropyldimethylsiloxy-terminated polydimethylsiloxane, methacryloxymethylsiloxy-terminated polydimethylsiloxanes, acryloxypropyldimethylsiloxy-terminated polydimethylsiloxanes, acryloxymethyldimethylsiloxy-terminated polydimethylsiloxanes, polydimethylsilo xane-polymethyl-methacryloxypropylsiloxane copolymers and polydimethylsiloxane-polymethyl-acryloxypropylsiloxane copolymers.

Good results have been obtained with methacryloxypropyldimethylsiloxy-terminated polydimethylsiloxanes of varying molecular weights, acrylate-terminated polydimethylsiloxane (Siltech Silmer Di-50), tetramethyl,dimethacryloxypropyldisiloxane, and 3-methacryloxypropyl trimethoxysilane as Component (B).

Optional Solvent for Component (B)

In some embodiments, the preparation of both surface-modified hydrogels and hydrogel microparticles involves optionally treating in the presence of a suitable solvent for Component (B). In some embodiments, suitable solvents for Component (B) may be selected from water-immiscible solvents such as silicones, organic compounds, and "ecologically-friendly" solvents such as ionic liquids and supercritical fluids; and mixtures thereof. Examples of suitable solvents include, but are not limited to, linear, branched, hyperbranched and cyclic organosiloxane fluids, such as hexamethyldisiloxane, octamethyltrisiloxane, decamethyltetrasiloxane, and trimethylsilyl-terminated polydimethylsiloxane fluids having a viscosity of less than 1000 cP at 25° C., or a mixture thereof; capryllylmethyl trisiloxane; octamethylcyclotetrasiloxane; decamethylcyclopentasiloxane; and higher cyclosiloxanes and mixtures thereof. In some embodiments, trimethylsilyl-terminated polydimethylsiloxane fluids are suitable as solvents for Component (B). In some embodiments, suitable trimethylsilyl-terminated polydimethylsiloxane fluids have a viscosity of from about 0.5 to about 100 cP at 25° C. Other suitable solvents include, but are not limited to, organic solvents immiscible with water, such as pentane, hexane, heptane, octane, cyclohexane, toluene, xylenes, ethyl acetate. Further examples of suitable solvents for Component (B) include, but are not limited to, organic oils such as isododecane, isohexadecane, isodecyl-neopentanoate, isononyl isononanoate, isoparaffin, isoalkane, and ionic liquids including, 1-ethenyl-3-ethyl-imidazolium hexafluorophosphate and tetrapropyl-ammonium tetracyanoborate, and supercriticial fluids such as supercritical carbon dioxide.

Component (C), Organoborane Free Radical Initiator

In the preparation of both surface-modified hydrogels and hydrogel microparticles, Component (C) is at least one organoborane compound that is capable of generating a free radical and initiating free radical addition polymerization and/or crosslinking Stabilized organoborane compounds that render the organoborane non-pyrophoric at ambient conditions may be used. In some embodiments, Component (C) is a complex formed between an organoborane and a suitable organonitrogen (for example, an amine) that renders the complex stable at ambient conditions, wherein a free radical is generated (and polymerization is initialized) upon introduction of an organonitrogen-reactive compound in the presence of oxygen. In some embodiments, Component (C) is an organoborane compound wherein a free radical is generated (and polymerization is initiated) upon heating. In some embodiments, Component (C) is a solvent-stabilized organoborane (for example, a solution of a trialkylborane in THF) where the solvent is allowed to evaporate to liberate the borane and thereby create a radical.

In some embodiments, Component (C) is an organoborane-organonitrogen complex that may be selected from complexes having the formula:

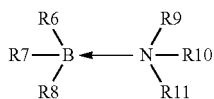

wherein B represents boron and N represents nitrogen; wherein at least one of R6, R7, and R8 contains one or more silicon atoms with the silicon-containing group(s) covalently attached to boron; wherein R6, R7, and R8 are groups that can be independently selected from hydrogen, a cycloalkyl group, a linear or branched alkyl group having 1-12 carbon atoms on the backbone, an alkylaryl group, an organosilane group such as an alkylsilane or an arylsilane group, an organosiloxane group, an alkylene group capable of functioning as a covalent bridge to another boron atom, a divalent organosiloxane group capable of function as a covalent bridge to another boron atom, or halogen substituted homologues thereof; wherein R9, R10, and R11 are groups that yield an amine compound or a polyamine compound capable of complexing with boron and are independently selected from hydrogen, an alkyl group containing 1-10 carbon atoms, a halogen substituted alkyl group containing 1-10 carbon atoms, or an organosilicon functional group; and wherein at least two of the R6, R7, and R8 groups and at least two of the R9, R10, and R11 groups can combine to form heterocyclic structures, provided that the sum of the number of atoms from the two combining groups does not exceed 11.

In some embodiments, Component (C) may be selected from alkylborane-organonitrogen complexes that include, but are not limited to, trialkylborane-organonitrogen complexes comprising trialkylboranes having the formula BR"$_3$, wherein R" represents linear and branched aliphatic or aromatic hydrocarbon groups containing 1-20 carbon atoms. Examples of suitable trialkylboranes include, but are not limited to, trimethylborane, triethylborane, tri-n-butylborane, tri-n-octylborane, tri-sec-butylborane, tridodecylborane, and phenyldiethylborane. In other embodiments, Component (C) may be selected from organosilicon-functional borane—organonitrogen complexes such as those disclosed in WO2006073695 A1.

Examples of suitable organonitrogens for forming the organoborane-organonitrogen complexes of Component (C) include, but are not limited to, 1,3 propane diamine; 1,6-hexanediamine; methoxypropylamine; pyridine; isophorone diamine; and silicon-containing amines such as 3-aminopropyltrimethoxysilane, 3-aminopropyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxethoxy)silane, N-(2-amino ethyl)-3-aminopropyltrimethoxysilane, N-(6-aminohexyl)aminomethyltrimethoxysilane, N-(2-amino ethyl)-hI-aminoundecyltrimethoxysilane, (aminoethylaminomethyl)-p-benethyltrimethoxysilane, N-(2-amino ethyl)-3-aminopropylmethyldimethoxysilane, N-(2-aminoethyl)-3-aminoisobutylmethyldimethoxysilane, and (3-trimethoxysilylpropyl)diethylene-triamine.

In some embodiments, nitrogen-containing compounds that may be useful for forming the organoborane-organonitrogen complexes of Component (C) may be selected from organopolysiloxanes having least one amine functional group. Examples of suitable amine functional groups include, but are not limited to, 3-aminopropyl, 6-aminohexyl, 11-aminoundecyl, 3-(N-allylamino)propyl, N-(2-aminoethyl)-3-aminopropyl, N-(2-aminoethyl)-1-aminoisobutyl, p-aminophenyl, 2-ethylpyridine, and 3-propylpyrrole. Such organopolysiloxanes include, but are not limited to, those having formulas similar to the previously described formulas (1) and (2). Other nitrogen-containing compounds that may be useful for forming the organoborane-organonitrogen complexes of Component (C) include, but are not limited to, N-(3-triethyoxysilylpropyl)-4,5-dihydroimidazole, ureidopropyltriethoxysilane, siloxanes having formulas similar to the previously described formulas (1) and (2), and organopolysiloxane resins in which at least one group is an imidazole, amidine, or ureido functional group.

In some embodiments, a free radical is generated by, and polymerization and/or crosslinking is initiated by, heating an organoborane compound (preferably organoborane-organonitrogen complex) or by simply exposing an anaerobically contained alkylborane of Component (C) to air. In some embodiments, a free radical is generated by, and polymerization and/or crosslinking is initiated by, heating an organoborane-organonitrogen complex of Component (C), wherein heating causes dissociation of the complex. In some embodiments, a free radical is generated by, and polymerization and/or crosslinking is initiated by, combining an organonitrogen-reactive compound of Component (E) with an organoborane-organonitrogen complex of Component (C) in an oxygen environment, wherein the combination causes dissociation of the complex. With respect to the latter, a free radical can be generated at temperatures below the dissociation temperature of the organoborane-organonitrogen complex, such as at or below ambient temperature.

Although organonitrogen-stabilized organoborane compounds are particularly useful as Component (C), one of skill in the art will understand that any organoborane may be used. Examples of alternate stabilized forms of organoboranes useful for this invention, include ring stabilized compounds, such as 9-BBN, or solvent complexed organoboranes such as trialkylborane-THF solutions.

In some embodiments, Component (C) may be a trialkylborane-organonitrogen complex wherein the trialkylborane is selected from triethylborane, tri-n-butylborane, tri-n-octylborane, tri-sec-butylborane, and tridodecylborane. For example, Component (C) may be selected from triethylborane-propanediamine, triethylborane-butylimidazole, triethylborane-methoxypropylamine, tri-n-butyl borane-methoxypropylamine, triethylborane-isophorone diamine, tri-n-butyl borane-isophorone diamine, and triethylborane-aminosilane or triethylborane-aminosiloxane complexes.

Good results have been obtained with tri-n-butyl borane complexed with 3-methoxypropyl amine (TNBB-MOPA) and a triethylborane 1,3-diamino propane complex (TEB-PDA).

Component (D), Absorbable Solvent

In the preparation of both surface-modified hydrogels and hydrogel microparticles, Component (D) is at least one solvent that is absorbable by the hydrogel or hydrogel microparticle. In some embodiments, the absorbable solvent may be selected from water, water-compatible alcohols, diols, polyols, and combinations thereof. Examples of suitable alcohols include, but are not limited to, methanol, ethanol, isopropyl alcohol, ethylene glycol, polyethylene glycol, and combinations thereof. In some embodiments, the absorbable solvent may be a combination of one or more water-compatible alcohols with water.

Optional Component (E), Organonitrogen-Reactive Compound

In the preparation of both surface-modified hydrogels and hydrogel microparticles, optional Component (E) is at least one organonitrogen-reactive compound that, when combined with the organoborane-organonitrogen complex of Component (C) and exposed to an oxygenated environment, is capable of causing the organoborane-organonitrogen complex to dissociate, thereby initiating free radical polymerization and/or crosslinking. The presence of such an organonitrogen-reactive compound allows for polymerization and/or crosslinking to occur rapidly at temperatures below the dissociation temperature of the organoborane-organonitrogen complexes of Component (C), including at room temperature and below.

Some examples of suitable organonitrogen-reactive compounds of Component (E) include, but are not limited to, mineral acids, Lewis acids, carboxylic acids, carboxylic acid derivatives such as anhydrides and succinates, carboxylic acid metal salts, isocyanates, aldehydes, epoxides, acid chlorides, and sulfonyl chlorides, acetic acid, acrylic acid, methacrylic acid, polyacrylic acid, polymethacrylic acid, methacrylic anhydride, undecylenic acid, oleic acid, stearic acid, citric acid, levulinic acid, 2-carboxyethyl acrylate, isophorone diisocyanate monomers or oligomers, methacryloylisocyanate, 2-(methacryloyloxy)ethyl acetoacetate, undecylenic aldehyde, and dodecyl succinic anhydride.

In some embodiments, Component (A) may be an organic acid that also is an organonitrogen-reactive compound. For example, polyacrylic acid may serve as both an organic polymer and an organonitrogen-reactive compound.

Additionally, organosilanes or organopolysiloxanes having organonitrogen-reactive groups can be suitable for Component (E). Such compounds include, but are not limited to, 3-iso cyanatopropyltrimethoxysilane; 3-glycidoxypropyltrimethoxysilane; propylsuccinic anhydride functionalized linear, branched, resinous, and hyperbranched organopolysiloxanes; cyclohexenyl anhydride functional linear, resinous, and hyperbranched organopolysiloxanes; carboxylic acid functionalized linear, branched, resinous, and hyperbranched organopolysiloxanes such as carboxydecyl terminated oligomeric or polymeric polydimethylsiloxanes; and aldehyde functionalized linear, branched, resinous, and hyperbranched organopolysiloxanes such as undecylenic aldehyde-terminated oligomeric or polymeric polydimethylsiloxanes.

Other suitable organonitrogen-reactive compounds for Component (E) are silicon containing compounds that, when exposed to moisture, release an acid that causes the organoborane-organonitrogen complex of Component (C) to disassociate. Such compounds include, but are not limited to, halo silanes, acid anhydride (carboxylic acid) siloxanes, acetoxy siloxanes (such as ethylriacetoxysiloxane and methyl triacetoxysiloxane), alkyl silicic acids, esters of carboxylic acids and silanols, acid chloride siloxanes.

Further examples of compounds that can be useful for Component (E) are those capable of generating organonitrogen-reactive groups when exposed to ultraviolet radiation, such as iodonium salts containing $[SbF_6]^-$ counterions. With such compounds, it may be useful to also include a photosensitizing compound such as isopropylthioxanthone.

One of skill in the art will recognize that the selection of the organonitrogen-reactive compound for Component (E) will depend upon, among other things, the nature of Component (C). In some embodiments, Component (E) may be selected from acids, anhydrides, isocyanates, epoxides, and aldehydes. In some embodiments, Component (E) is selected from acetic acid, polyacrylic acid, acrylic acid, 2-carboxyethylacrylate, citric acid, and ascorbic acid. Good results have been obtained with polyacrylic acid, acetic acid, hydrochloric acid and citric acid as Component (E).

When an organonitrogen-reactive compound is used, free radical generation requires the presence of oxygen. In some embodiments, merely exposing the organonitrogen-reactive compound or the composition containing the organonitrogen-reactive compound to air is sufficient to induce polymerization. In some embodiments, the oxygen dissolved in one or more of the other components of the composition is sufficient. To prevent pre-mature polymerization in the presence of oxygen, Component (C) and Component (E) may be physically or chemically isolated until just prior to the desired time to initiate polymerization and/or crosslinking reactions. For example, the composition may be prepared initially as two separate solutions that are combined into one, just prior to the initiation of polymerization and/or crosslinking. The remaining components of the composition may be distributed in any manner between the two solutions, as long as Component (C) and Component (E) do not contact each other. Alternatively, Components (C) and (E), or both, can be encapsulated or delivered in separate phases. For example, one or both of the Components (C) and (E) can be introduced into the composition in a solid form that prevents their intimate mixing. Polymerization of the composition can be activated by (a) heating it above the softening temperature of the solid phase component or encapsulant, or (b) by the introduction of a solubilizing agent that allows mixing of Components (C) and (E). Alternatively, Components (C) and (E) can be combined and packaged anaerobically in a single container, and polymerization can be initiated by introduction of oxygen to the composition.

In some embodiments, Component (E) is optional. In such cases, free radical polymerization may be initiated by exposing the organoborane compound to air, by thermal activation, or via radiation. In the case of thermal activation, the temperature to which the one or more components of the composition must be heated to initiate polymerization is dictated by the nature of the organoborane compound selected as Component (C). For example, if an organoborane-organonitrogen complex is selected as Component (C), the binding energy of the complex will dictate the temperature to which the composition must be heated to initiate dissociation of the complex and polymerization. In some embodiments, Component (C) may be heated prior to its introduction with the other components of the composition. In some embodiments, Component (C) and at least one other component are heated prior to the introduction of any remaining components of the composition.

Optional Component (F), Active Ingredient

In the preparation of both surface-modified hydrogels and hydrogel microparticles, optional Component (F) is selected from least one personal care or healthcare active ingredient, or at least one agricultural active ingredient. In some embodiments, Component (F) can be added to a hydrogel or hydrogel microparticle for in situ encapsulation, wherein addition can occur prior to treatment of the hydrogel or hydrogel microparticle with Components (B) and (C), after treatment with Components (B) and (C), during treatment with Components (B) and (C), or combinations thereof. In some embodiments, thermally-sensitive active ingredients are incorporated into a hydrogel or hydrogel microparticle at temperatures below their threshold temperature for thermal response or decomposition. In some embodiments, the active ingredient suspended in the hydrogel or hydrogel microparticle can be, but is not required to be, in particulate form. When the active ingredient is in particulate form at the conditions of encapsulation, its particle size, distribution, or shape is not limited. By careful selection of the other components in the hydrogel or hydrogel microparticle, a desirable mechanism of release of the active ingredient may be achieved. Examples of release mechanisms include extraction, dissolution, swelling, melting, softening, degradation, abrading, squeezing or cracking via thermal, mechanical, or chemical or radiation-induced stress.

The amount of Component (F) present in the hydrogel or hydrogel microparticle may vary, but in some embodiments ranges from about 0% to about 50% (by weight), alternatively from about 1% to about 25% (by weight), alternatively from about 1% to about 10% (by weight), based on the amount by total weight of the hydrogel or hydrogel microparticle.

As used herein, a "personal care or healthcare active ingredient" means any compound or mixtures of compounds that may be used as additives in personal care formulations that are typically added for the purpose of providing a cosmetic and/or aesthetic benefit, a pharmaceutical or medical benefit, a pharmacological activity or other direct effect in the diagnosis, cure, mitigation, treatment, or prevention of disease, or to affect the structure or any function of the body of a human or other animals. Thus, "personal care and healthcare active ingredient" includes, but is not limited to, an active ingredient or active drug ingredient as generally used and defined by the United States Department of Health & Human Services Food and Drug Administration, contained in Title 21, Chapter I, of the Code of Federal Regulations, Parts 200-299 and Parts 300-499.

In some embodiments, active ingredients suitable for Component (F) include both fat or oil-soluble vitamins, as well as water-soluble vitamins. Oil-soluble vitamins useful as Component (F) include, but are not limited to, Vitamin A1, RETINOL, C2-C18 esters of RETINOL, Vitamin E, TOCOPHEROL, esters of Vitamin E, and mixtures thereof RETINOL includes trans-RETINOL, 1,3-cis-RETINOL, 11-cis-RETINOL, 9-cis-RETINOL, and 3,4-didehydro-RETINOL. It should be noted that RETINOL is an International Nomenclature Cosmetic Ingredient Name (INCI) designated by The Cosmetic, Toiletry, and Fragrance Association (CTFA), Washington D.C., for vitamin A. Other suitable vitamins and the INCI names for the vitamins considered included herein are RETINYL ACETATE, RETINYL PALMITATE, RETINYL PROPIONATE, a-TOCOPHEROL, TOCOPHERSOLAN, TOCOPHERYL ACETATE, TOCOPHERYL LINOLEATE, TOCOPHERYL NICOTINATE, and TOCOPHERYL SUCCINATE.

Water-soluble vitamins useful as Component (F) include, but are not limited to, Vitamin C, Vitamin B1, Vitamin B2, Vitamin B6, Vitamin B12, niacin, folic acid, biotin, and pantothenic acid. Other suitable water-soluble vitamins and the INCI names for the vitamins considered included herein are ASCORBYL DIPALMITATE, ASCORBYL METHYLSILANOL PECTINATE, ASCORBYL PALMITATE, and ASCORBYL STEARATE.

Some examples of commercially available products suitable for use as Component (F) are Vitamin A Acetate and Vitamin C, both products of Fluka Chemie AG, Buchs, Switzerland; COVI-OX T-50, a Vitamin E product of Henkel Corporation, La Grange, Ill.; COVI-OX T-70, another Vitamin E product of Henkel Corporation, La Grange, Ill.; and Vitamin E Acetate, a product of Roche Vitamins & Fine Chemicals, Nutley, N.J.

In some embodiments, the personal care or healthcare active ingredient used as Component (F) can be a water-soluble or an oil-soluble active drug ingredient. Representative examples of some suitable water-soluble active drug ingredients which can be used are hydrocortisone, ketoprofen, timolol, pilocarpine, adriamycin, mitomycin C, morphine, hydromorphone, diltiazem, theophylline, doxorubicin, daunorubicin, heparin, penicillin G, carbenicillin, cephalothin, cefoxitin, cefotaxime, 5-fluorouracil, cytarabine, 6-azauridine, 6-thioguanine, vinblastine, vincristine, bleomycin sulfate, aurothioglucose, suramin, and mebendazole.

Representative examples of some suitable oil-soluble active drug ingredients which can be used as Component (F) are clonidine, scopolamine, propranolol, phenylpropanolamine hydrochloride, ouabain, atropine, haloperidol, isosorbide, nitroglycerin, ibuprofen, ubiquinones, indomethacin, prostaglandins, naproxen, salbutamol, guanabenz, labetalol, pheniramine, metrifonate, and steroids.

Considered to be included herein as active drug ingredients for purposes of the present invention are antiacne agents such as benzoyl peroxide and tretinoin; antibacterial agents such as chlorohexadiene gluconate; antifungal agents such as miconazole nitrate; anti-inflammatory agents; corticosteroidal drugs; non-steroidal anti-inflammatory agents such as diclofenac; antipsoriasis agents such as clobetasol propionate; anaesthetic agents such as lidocaine; antipruritic agents; and antidermatitis agents.

In some embodiments, component (F) can also be a protein, such as an enzyme. Enzymes include, but are not limited to, commercially available types, improved types, recombinant types, wild types, variants not found in nature, and mixtures thereof. For example, suitable enzymes include hydrolases, cutinases, oxidases, transferases, reductases, hemicellulases, esterases, isomerases, pectinases, lactases, peroxidases, laccases, catalases, and mixtures thereof. Hydrolases include, but are not limited to, proteases (bacterial, fungal, acid, neutral or alkaline), amylases (alpha or beta), lipases, mannanases, cellulases, collagenases and mixtures thereof.

In some embodiments, component (F) may be a sunscreen agent. The sunscreen agent can be selected from any sunscreen agent known in the art to protect skin from the harmful effects of exposure to sunlight. The sunscreen can be an organic compound, an inorganic compound, or mixtures thereof. Thus, representative non limiting examples that can be used as the sunscreen agent include; Aminobenzoic Acid, Cinoxate, Diethanolamine Methoxycinnamate, Digalloyl Trioleate, Dioxybenzone, Ethyl 4-[bis(Hydroxypropyl)] Aminobenzoate, Glyceryl Aminobenzoate, Homosalate, Lawsone with Dihydroxyacetone, Menthyl Anthranilate, Octocrylene, Octyl Methoxycinnamate, Octyl Salicylate, Oxybenzone, Padimate 0, Phenylbenzimidazole Sulfonic Acid, Red Petrolatum, Sulisobenzone, Titanium Dioxide, and Trolamine Salicylate.

The organic sunscreen compound is typically chosen from an organic compound that absorbs ultraviolet (UV) light. Some examples of UV light absorbing compounds are Acetaminosalol, Allatoin PABA, Benzalphthalide, Benzophenone, Benzophenone 1-12, 3-Benzylidene Camphor, Benzylidenecamphor Hydrolyzed Collagen Sulfonamide, Benzylidene Camphor Sulfonic Acid, Benzyl Salicylate, Bornelone, Bumetriozole, Butyl Methoxydibenzoylmethane, Butyl PABA, Ceria/Silica, Ceria/Silica Talc, Cinoxate, DEA-Methoxycin namate, Dibenzoxazol Naphthalene, Di-t-Butyl Hydroxybenzyl idene Camphor, Digalloyl Trioleate, Diisopropyl Methyl Cinnamate, Dimethyl PABA Ethyl Cetearyldimonium Tosylate, Dioctyl Butamido Triazone, Diphenyl Carbomethoxy Acetoxy Naphthopyran, Disodium Bisethylphenyl Tiamminotriazine Stilbenedisulfonate, Disodium Distyrylbiphenyl Triaminotriazine Stilbenedisulfonate, Disodium Distyrylbiphenyl Disulfonate, Drometrizole, Drometrizole Trisiloxane, Ethyl Dihydroxypropyl PABA, Ethyl Diisopropylcinnamate, Ethyl Methoxycinnamate, Ethyl PABA, Ethyl Urocanate, Etrocrylene Ferulic Acid, Glyceryl Octanoate Dimethoxycinnamate, Glyceryl PABA, Glycol Salicylate, Homosalate, Isoamyl p-Methoxycinnamate, isopropylbenzyl Salicylate, Isopropyl Dibenzolylmethane, isopropyl Methoxycinnamate, Menthyl Anthranilate, Menthyl Salicylate, 4-Methylbenzylidene, Camphor, Octocrylene, Octrizole, Octyl Dimethyl PABA, Octyl Methoxycinnamate, Octyl Salicylate, Octyl Triazone, PABA, PEG-25 PABA, Pentyl Dimethyl PABA, Phenylbenzimidazole Sulfonic Acid, Polyacrylamidomethyl Benzylidene Camphor, Potassium Methoxycinnamate, Potassium Phenylbenzimidazole Sulfonate, Red Petrolatum, Sodium Phenylbenzimidazole Sulfonate, Sodium Urocanate, TEA-Phenylbenzimidazole Sulfonate, TEA-Salicylate, Terephthalylidene Dicamphor Sulfonic Acid, Titanium Dioxide, TriPABA Panthenol, Urocanic Acid, and VA/Crotonates/Methacryloxybenzophenone copolymer.

Alternatively, the sunscreen agent is a cinnamate based organic compound, or alternatively, the sunscreen agent is octyl methoxycinnamate, such as Uvinul® MC 80 an ester of para-methoxycinnamic acid and 2-ethylhexanol.

In some embodiments, Component (F) may be any perfume or fragrance active ingredient commonly used in industry. These compositions typically belong to a variety of chemical classes, as varied as alcohols, aldehydes, ketones, esters, ethers, acetates, nitrites, terpenic hydrocarbons, heterocyclic nitrogen or sulphur containing compounds, as well as essential oils of natural or synthetic origin. Many of these perfume active ingredients are described in detail in standard textbook references such as Perfume and Flavor Chemicals, 1969, S. Arctander, Montclair, N.J.

Fragrance active ingredients may be exemplified by, but not limited to, perfume ketones and perfume aldehydes. Illustrative of the perfume ketones are buccoxime; iso jasmone; methyl beta naphthyl ketone; musk indanone; tonalid/musk plus; Alpha-Damascone, Beta-Damascone, Delta-Damascene, Iso-Damascone, Damascenone, Damarose, Methyl-Dihydrojasmonate, Menthone, Carvone, Camphor, Fenchone, Alpha-lonone, Beta-lonone, Gamma-Methyl so-called Ionone, Fleuramone, Dihydroj asmone, Cis-Jasmone, Iso-E-Super, Methyl-Cedrenyl-ketone or Methyl-Cedrylone, Acetophenone, Methyl-Acetophenone, Para-Methoxy-Acetophenone, Methyl-Beta-Naphtyl-Ketone, Benzyl-Acetone, Benzophenone, Para-Hydroxy-Phenyl-Butanone, Celery Ketone or Livescone, 6-Isopropyl-decahydro-2-naphtone, Dimethyl-Octenone, Freskomenthe, 4-(1-Ethoxyvinyl)-3,3,5,5,-tetramethylCyclohexanone Methyl-Heptenone, 2-(2-(4-Methyl-3-cyclohexen-1-yl)propyl)-cyclopentanone, 1-(p-Menthen-6(2)-yl)-1-propanone, 4-(4-Hydroxy-3-methoxyphenyl)-2-butanone, 2-Acetyl-3,3-Dimethyl-Norbornane, 6,7-Dihydro-1,1,2,3,3-Pentamethyl-4(5H)-indanone 4-Damascol, Dulcinyl or Cassione, Gelsone, Hexylon, Isocyclemone E, Methyl Cyclocitrone, Methyl-Lavender-Ketone, Orivon, Para-tertiary-Butyl-Cyclohexanone, Verdone, Delphone, Muscone, Neobutenone, Plicatone, Veloutone, 2,4,4,7-Tetramethyl-oct-6-en-3-one, and Tetrameran.

Perfume ketones may be, but are not required to be, selected for its odor character from Alpha Damascone, Delta Damascone, Iso Damascone, Carvone, Gamma-Methyl-Ionone, Iso-E-Super, 2,4,4,7-Tetramethyl-oct-6-en-3-one, Benzyl Acetone, Beta Damascone, Damascenone, methyl dihydrojasmonate, methyl cedrylone, and mixtures thereof.

Perfume aldehydes may be, but are not required to be, selected for their odor character from adoxal; anisic aldehyde; cymal; ethyl vanillin; florhydral; helional; heliotropin; hydroxycitronellal; koavone; lauric aldehyde; lyral; methyl nonyl acetaldehyde; P. T. bucinal; phenyl acetaldehyde; undecylenic aldehyde; vanillin; 2,6,10-trimethyl-9-undecenal, 3-dodecen-1-al, alpha-n-amyl cm namic aldehyde, 4-methoxybenzaldehyde, benzaldehyde, 3-(4-tert butylphenyl)-propanal, 2-methyl-3-(para-methoxyphenyl propanal, 2-methyl-4-(2,6,6-trimethyl-2(1)-cyclohexen-1-yl) butanal, 3-phenyl-2-propenal, cis-/trans-3,7-dimethyl-2,6-octadien-1-al, 3,7-dimethyl-6-octen-1-al, [(3,7-dimethyl-6-octenyl) oxy]acetaldehyde, 4-isopropylbenzaldehyde, 1,2,3,4,5,6,7, 8-octahydro-8,8-dimethyl-2-naphthaldehyde, 2,4-dimethyl-3-cyclohexen-1-carboxaldehyde, 2-methyl-3-(isopropylphenyl)propanal, 1-decanal; decyl aldehyde, 2,6-dimethyl-5-heptenal, 4-(tricyclo [5.2.1.0(2,6)]-decylidene-8)-butanal, octahydro-4,7-methano-1H-indenecarboxaldehyde, 3-ethoxy-4-hydroxy benzaldehyde, para-ethyl-alpha, alpha-dimethyl hydrocinnamaldehyde, alpha-methyl-3,4-methylenedioxy)-hydrocinnamaldehyde, 3,4-methylenedioxybenzaldehyde, alpha-n-hexyl cinnamic aldehyde, m-cymene-7-carboxaldehyde, alpha-methyl phenyl acetaldehyde, 7-hydroxy-3,7-dimethyl octanal, Undecenal, 2,4,6-trimethyl-3-cyclohexene-1-carboxaldehyde, 4-(3) (4-methyl-3-pentenyl)-3-cyclohexen-carboxaldehyde, 1-dodecanal, 2,4-dimethyl cyclohexene-3-carboxaldehyde, 4-(4-hydroxy-4-methyl pentyl)-3-cylohexene-1-carboxaldehyde, 7-methoxy-3,7-dimethyloctan-1-al, 2-methyl undecanal, 2-methyl decanal, 1-nonanal, 1-octanal, 2,6,10-trimethyl-5,9-undecadienal, 2-methyl-3(4-tertbutyl)propanal, dihydrocinnamic aldehyde, 1-methyl-4-(4-methyl-3-pentenyl)-3-cyclohexene-1-carbox aldehyde, 3,7-dimethyloctan-1-al, 1-undecanal, 10-undecen-1-al, 4-hydroxy-3-methoxy benzaldehyde, 1-methyl-3-(4-methylpentyl)-3-cyclhexenecarboxaldehyde, 7-hydroxy-3,7-dimethyl-octanal, trans-4-decenal, 2,6-nonadienal, paratolylacetaldehyde; 4-methylphenylacetaldehyde, 2-methyl-4-(2,6,6-trimethyl-1-cyclohexen-1-yl)-2-butena I, ortho-methoxycinnamic aldehyde, 3,5,6-trimethyl-3-cyclohex ene carboxaldehyde, 3,7-dimethyl-2-methylene-6-o ctenal, phenoxyacetaldehyde, 5,9-dimethyl-4,8-decadienal, peony aldehyde (6,10-dimethyl-3-oxa-5,9-undecadien-1-aI), hexahydro-4,7-methanoindan-1-carboxaldehyde, 2-methyl octanal, alpha-methyl-4-(1-methyl ethyl)benzene acetaldehyde, 6,6-dimethyl-2-norpinene-2-propionaldehyde, para methyl phenoxy acetaldehyde, 2-methyl-3-phenyl-2-propen-1-al, 3,5,5-trimethyl hexanal, Hexahydro-8,8-dimethyl-2-naphthaldehyde, 3-propyl-bicyclo[2.2. 1]-hept-5-ene-2-carbaldehyde, 9-decenal, 3-methyl-5-phenyl-1-pentanal, methyl-nonyl acetaldehyde, hexanal, trans-2-hexenal, 1-p-menthene-q-carboxaldehyde and mixtures thereof.

Aldehydes may also be selected for their odor character from 1-decanal, benzaldehyde, florhydral, 2,4-dimethyl-3-cyclohexen-1-carboxaldehyde; cis/trans-3,7-dimethyl-2,6-o ctadien-1-al; heliotropin; 2,4,6-trimethyl-3-cyclohexene-1-carboxaldehyde; 2,6-nonadienal; alpha-n-amyl cinnamic aldehyde, alpha-n-hexyl cinnamic aldehyde, P.T. Bucinal, lyral, cymal, methyl nonyl acetaldehyde, hexanal, trans-2-hexenal, and mixture thereof.

In the above list of perfume active ingredients, some are commercial names conventionally known to one skilled in the art, and also includes isomers. Such isomers are also suitable for use in the present invention.

In some embodiments, Component (F) may be one or more plant extracts. Examples of these components are as follows: Ashitaba extract, avocado extract, hydrangea extract, Althea extract, Arnica extract, aloe extract, apricot extract, apricot kernel extract, Ginkgo Biloba extract, fennel extract, turmeric[Curcuma] extract, oolong tea extract, rose fruit extract, Echinacea extract, Scutellaria root extract, Phellodendro bark extract, Japanese Coptis extract. Barley extract, Hyperium extract, White Nettle extract, Watercress extract, Orange extract, Dehydrated saltwater, seaweed extract, hydrolyzed elastin, hydrolyzed wheat powder, hydrolyzed silk, Chamomile extract, Carrot extract, Artemisia extract, Glycyrrhiza extract, hibiscus tea extract, Pyracantha Fortuneana Fruit extract, Kiwi extract, Cinchona extract, cucumber extract, guanocine. Gardenia extract, Sasa Albo-marginata extract, Sophora root extract, Walnut extract, Grapefruit extract, Clematis extract, Chlorella extract, mulberry extract, Gentiana extract, black tea extract, yeast extract, burdock extract, rice bran ferment extract, rice germ oil, comfrey extract, collagen, cowberry extract, Gardenia extract, Asiasarum Root extract, Family of Bupleurum extract, Salvia extract, Saponaria extract, Bamboo extract, Crataegus fruit extract, Zanthoxylum fruit extract, shiitake extract, Rehmannia root extract, gromwell extract, Perilla extract, linden extract, Filipendula extract, peony extract, Calamus Root extract, white birch extract, Horsetail extract, Hedera Helix(Ivy) extract, hawthorn extract, Sambucus nigra extract, Achillea millefolium extract, Mentha piperita extract, sage extract, mallow extract, Cnidium officinale Root extract, Japanese green gentian extract, soybean extract, jujube extract, thyme extract, tea extract, clove extract, Gramineae imperata cyrillo extract, Citrus unshiu peel extract Japanese Angellica Root extract, Calendula extract. Peach Kernel extract, Bitter orange peel extract, Houttuyna cordata extract, tomato extract, natto extract, Ginseng extract, Green tea extract (camelliea sinesis), garlic extract, wild rose extract, hibiscus extract, Ophiopogon tuber extract, Nelumbo nucifera extract, parsley extract, honey, hamamelis extract, Parietaria extract, Isodonis herba extract, bisabolol extract, Loquat extract, coltsfoot extract, butterbur extract, Porid cocos wolf extract, extract of butcher's broom, grape extract, propolis extract, luffa extract, safflower extract, peppermint extract, linden tree extract, Paeonia extract, hop extract, pine tree extract, horse chestnut extract, Mizu-bashou extract, Mukurossi peel extract, Melissa extract, peach extract, cornflower extract, eucalyptus extract, saxifrage extract, citron extract, coix extract, mugwort extract, lavender extract, apple extract, lettuce extract, lemon extract, Chinese milk vetch extract, rose extract, rosemary extract, Roman Chamomile extract, and royal jelly extract.

In some embodiments, Component (F) comprises at least one agricultural active ingredient. As used herein, an "agricultural active ingredient" means any compound or mixtures of compounds that may be additives in formulations that are typically added for the purpose of treating plants.

Examples of suitable agricultural active ingredients include, but are not limited to, 2-phenylphenol; 8-hydroxyquinoline sulfate; AC 382042; Ampelomyces quisqualis; Azaconazole; Azoxystrobin; *Bacillus subtilis*; Benalaxyl; Benomyl; Biphenyl; Bitertanol; Blasticidin-S; Bordeaux mixture; Borax; Bromuconazole; Bupirimate; Calboxin; calcium polysulfide; Captafol; Captan; Carbendazim; Carpropanmid (KTU 3616); CGA 279202; Chinomethionat; Chlorothalonil; Chlozolinate; copper hydroxide; copper naphthenate; copper oxychloride; copper sulfate; cuprous oxide; Cymoxanil; Cyproconazole; Cyprodinil; Dazomet; Debacarb; Dichlofluanid; Dichlomezine; Dichlorophen; Diclocymet; Dicloran; Diethofencarb; Difenoconazole; Difenzoquat; Difenzoquat metilsulfate; Diflumetorim; Dimethirimol; Dimethomorph; Diniconazole; Diniconazole-M; Dinobuton; Dinocap; diphnenylamine; Dithianon; Dodemorph; Dodemorph acetate; Dodine; Dodine free base; Edifenphos; Epoxiconazole (BAS 480F); Ethasulfocarb; Ethirimol; Etridiazole; Famoxadone; Fenamidone; Fenarimol; Fenbuconazole; Fenfin; Fenfuram; Fenhexamid; Fenpiclonil; Fenpropidin; Fenpropimorph; Fentin acetate; Fentin hydroxide; Ferbam; Ferimzone; Fluazinam; Fludioxonil; Fluoroimide; Fluquinconazole; Flusilazole; Flusulfamide; Flutolanil; Flutriafol; Folpet; formaldehyde; Fosetyl; Fosetyl-aluminum; Fuberidazole; Furalaxyl; *Fusarium oxysporum*; *Gliocladium* vixens; Guazatine; Guazatine acetates; GY-81; hex achlorobenzene; Hexaconazole; Hymexazol; ICIA0858; IKF-916; Imazalil; Imazalil sulfate; Imibenconazole; Iminoctadine; Iminoctadine triacetate; Iminoctadine tris[Albesilate]; Ipconazole; Iprobenfos; Iprodione; Iprovalicarb; Kasugamycin; Kasugamycin hydrochloride hydrate; Kresoxim-methyl; Mancopper; Mancozeb; Maneb; Mepanipyrim; Mepronil; mercuric chloride; mercuric oxide; mercurous chloride; Metalaxyl; Metalaxyl-M; Metam; Metam-sodium; Metconazole; Methasulfocarb; methyl isothiocyanate; Metiram; Metominostrobin (SSF-126); MON65500; Myclotbutanil; Nabam; naphthenic acid; Natamycin; nickel bis(dimethyldithiocarbamate); Nitrothal-isopropyl; Nuarimol; Octhilinone; Ofurace; oleic acid (fatty acids); Oxadixyl; Oxine-copper; Oxycarboxin; Penconazole; Pencycuron; Pentachlorophenol; pentachlorophenyl laurate; Perfurazoate; phenylmercury acetate; *Phlebiopsis gigantea*; Phthalide; Piperalin; polyoxin B; polyoxins; Polyoxorim; potassium hydroxyquinoline sulfate; Probenazole; Prochloraz; Procymidone; Propamocarb; Propamocarb Hydrochloride; Propiconazole; Propineb; Pyrazophos; Pyributicarb; Pyrifenox; Pyrimethanil; Pyroquilon; Quinoxyfen; Quintozene; RH-7281; sec-butylamine; sodium 2-phenylphenoxide; sodium pentachlorophenoxide; Spiroxamine (KWG 4168); *Streptomyces griseoviridis*; sulfur; tar oils; Tebuconazole; Tecnazene; Tetraconazole; Thiabendazole; Thifluzamide; Thiophanate-methyl; Thiram; Tolclofos-methyl; Tolylfluanid; Triadimefon; Triadimenol; Triazoxide; *Trichoderma harzianum*; Tricyclazole; Tridemorph; Triflumizole; Triforine; Triticonzole; Validamycin; vinclozolin; zinc naphthenate; Zineb; Ziram; the compounds having the chemical name methyl (E,E)-2-(2-(1-(1-(2-pyridyl)propyloxyimino)-1-cyclopropylmethyloxymethyl)phenyl)-3-ethoxypropenoate and 3-(3,5-dichlorophenyl)-4-chloropyrazole; 2-anilino-4-methyl-6-cyclopropylpyrimidine; 2',6'-dibromo-2-methyl-4'-trifluoromethoxy-4'-trifluoromethyl-1,3-thiazol-5-carboxanilide; 2,6-dichloro-N-(4-trifluoromethylbenzyl)benzamide; (E)-2-methoximino-N-methyl-2-(2-phenoxyphenyl)-acetamide; 8-hydroxyquinoline sulfate; methyl (E)-2-{2-[6-(2-cyanophenoxy)-pyrimidin-4-yloxy]phenyl}-3-methoxyacrylate; methyl (E)-methoximino [alpha-(o-tolyloxy)-o-tolyl]acetate; 2-phenylphenol (OPP), ampropylfos, anilazine, benodanil, binapacryl, buthiobate, carboxin, quinomethionate, chloroneb, chloropicrin, cufraneb, cyprofuram, diclobutrazole, dichlofluanid, dipyrithione, ditalimfos, drazoxolone, fenitropan, fthalide, furmecyclox, isoprothiolane, methfuroxam, metsulfovax, oxamocarb, pefurazoate, penconazole, phosdiphen, pimaricin, tecloftalam, thicyofen, trichlamide, trifloxystrobin, 2-[2-(1-chloro cyclopropyl)-3-(2-chlorophenyl)-2-hydroxypropyl]-2,4-dihydro-[1,2,4]-triazole-3-thione 3-(1-[2-(4-[2-chlorophenoxy)-5-fluoropyrimid-6-yloxy)-phenyl]-1-(methoximino)-methyl)-5,6-dihydro-1,4, 2-dioxazine and N-methyl-2-(2-[6-(3-chloro-2-methylphenoxy)-5-fluoropyrmid-4-yloxy]phenyl)-2-methoximinoacetamide.

Examples of suitable agricultural active ingredients also include, but are not limited to, Abamectin; Acephate; Acetamiprid; oleic acid; Acrinathrin; Aldicarb; Alanycarb; Allethrin [(1R) isomers]; α-Cypermethrin; Amitraz; Avermectin B1 and its derivatives, Azadirachtin; Azamethiphos; Azinphos-ethyl; Azinphosmethyl; *Bacillus thurigiensi*; Bendiocarb; Benfuracarb; Bensultap; β-cyfluthrin; β-cypermethrin; Bifenazate; Bifenthrin; Bioallathrin; Bioallethrin (S-cyclopentenyl isomer); Bioresmethrin; Borax; Buprofezin; Butocarboxim; Butoxycarboxim; piperonyl butoxide; Cadusafos; Carbaryl; Carbofuran; Carbosulfan; Cartap; Cartap hydrochloride; Chordane; Chlorethoxyfos; Chlorfenapyr; Chlorfenvirnphos; Chlorfluazuron; Chlormephos; Chloropicrin; Chlorpyrifos; Chlorpyrifos-methyl; mercurous chloride; Coumaphos; Cryolite; Cryomazine; Cyanophos; calcium cyanide; sodium cyanide; Cycloprothrin; Cyfluthrin; Cyhalothrin; cypermethrin; cyphenothrin [(1R) transisomers]; Dazomet; DDT; Deltamethrin; Demeton-5-methyl; Diafenthiuron; Diazinon; ethylene dibromide; ethylene dichloride; Dichlorvos; Dicofol; Dicrotophos; Diflubenzuron; Dimethoate; Dimethylvinphos; Diofenolan; Disulfoton; DNOC; DPX-JW062 and DP; Empenthrin [(EZ)-(1R) isomers]; Endosulfan; ENT 8184; EPN; Esfenvalerate; Ethiofencarb; Ethion; Ethiprole having the chemical name 5-amino-3-cyano-1-(2,6-dichloro-4-trifluoromethylphenyl)-4-ethylsulfinylpyrazole; Ethoprophos; Etofenprox; Etoxazole; Etrimfos; Famphur; Fenamiphos; Fenitrothion; Fenobucarb; Fenoxycarb; Fenpropathrin; Fenthion; Fenvalerate; Fipronil and the compounds of the arylpyrazole family; Flucycloxuron; Flucythrinate; Flufenoxuron; Flufenprox; Flumethrin; Fluofenprox; sodium fluoride; sulfuryl fluoride; Fonofos; Formetanate; Formetanate hydrochloride; Formothion; Furathiocarb; Gamma-HCH; GY-81; Halofenozide; Heptachlor; Heptenophos; Hexaflumuron; sodium hexafluorosilicate; tar oils; petroleum oils; Hydramethylnon; hydrogen cyanide; Hydroprene; Imidacloprid; Imiprothrin; Indoxacarb; Isazofos; Isofenphos; Isoprocarb; Methyl isothiocyanal; Isoxathion; lambda-Cyalothrin; pentachlorophenyl laurate; Lufenuron; Malathion; MB-599; Mecarbam; Methacrifos; Methamidophos; Methidathion; Methiocarb; Methomyl; Methoprene; Methoxychlor; Metolcarb; Mevinphos; Milbemectin and its derivatives; Monocrotophos; Naled; nicotine; Nitenpyram; Nithiazine; Novaluron; Omethoate; Oxamyl; Oxydemeton-methyl; *Paecilomyces fumosoroseus*; Parathion; Parathion-methyl; pentachlorophenol; sodium pentachlorophenoxide; Permethrin; Penothrin [(1R)-trans-isomers]; Phenthoate; Phorate; Phosalone; Phosmet; Phosphamidon; phosphine; aluminum phosphide; magnesium phosphide; zinc phosphide; Phoxim; Pirimicarb; Pirimiphos-ethyl; Pirimiphos-methyl; calcium polysulfide; Prallethrin; Profenfos; Propaphos; Propetamphos; Propoxur; Prothiofos; Pyraclofos; pyrethrins (chrysanthemates, pyrethrates, pyrethrum); Pyretrozine; Pyridaben; Pyridaphenthion; Pyrimidifen; Pyriproxyfen; Quinalphos; Resmethrin; RH-2485; Rotenone; RU 15525; Silafluofen; Sulcofuron-sodium; Sulfotep; sulframide; Sulprofos; Ta-fluvalinate; Tebufenozide; Tebupirimfos; Teflubenzuron; Tefluthrin; Temephos; Terbufos; Tetrachlorvinphos; Tetramethrin; Tetramethrin [(1R) isomers]; O-cypermethrin; Thiametoxam; Thiocyclam; Thiocyclam hydrogen oxalate; Thiodicarb; Thiofanox; Thiometon; Tralomethrin; Transfluthrin; Triazamate; Triazophos; Trichlorfon; Triflumuron; Trimethacarb; Vamidothion; XDE-105; XMC; Xylylcarb; Zeta-cypermethrin; ZXI 8901; the compound whose chemical name is 3-acetyl-5-amino-1-[2,6-dichloro-4-(trifluoromethyl)phenyl]-2-methylsulfinylpyrazole; alphamethrin, AZ 60541, azinphos A, azinphos M, azocyclotin, 4-bromo-2-(4-chlorophenyl)-1-(ethoxymethyl)-5-(trifluoromethyl)-1H-pyrrole-3-carbonitrile, BPMC, brofenprox, bromophos A, bufencarb, butylpyridaben, carbophenothione, chloethocarb, N-[(6-chloro-3-pyridinyl)-methyl]-N'-cyano-N-methylethanimidamide, clocythrin, clofentezin, cyhexatin, cyromazin, clothianidin, demeton-M, demeton-S, dichlofenthion, dicliphos, diethion, dioxathion, emamectin, esfenvalerate, fenazaquin, fenbutatin oxide, fenothiocarb, fenpyrad, fenpyroximate, fluazuron, fluvalinate, fosthiazate, fubfenprox, hexythiazox, iprobenfos, ivermectin, mesulfenphos, metaldehyde, moxidectin, NC 184, oxydeprofos, promecarb, prothoate, pymetrozin, pyresmethrin, salithion, sebufos, tebufenpyrad, tebupirimiphos, terbam, thiacloprid, thiafenox, thiamethoxam, thiomethon, thuringiensin, triarathen, triazuron, trichlorfon, zetamethrin.

Examples of suitable agricultural active ingredients further include, but are not limited to, metaldehyde and methiocarb.

In addition, suitable examples of agricultural active ingredients include, but are not limited to, 2,3,6-TBA; 2,4-D; 2,4-D-2-ethylhexyl; 2,4-DB; 2,4-DB-butyl; 2,4-DB-dimethylammonium; 2,4-DB-isooctyl; 2,4-DB-potassium; 2,4-DB-sodium; 2,4-D-butotyl (2,4-D-Butotyl (2,4-D Butoxyethyl Ester)); 2,4-D-butyl; 2,4-D-dimethylammonium; 2,4-D-Diolamine; 2,4-D-isoctyl; 2,4-D-isopropyl; 2,4-D-sodium; 2,4-D-trolamine; Acetochlor; Acifluorfen; Acifluorfen-sodium; Aclonifen; Acrolein; AKH-7088; Alachlor; Alloxydim; Alloxydim-sodium; Ametryn; Amidosulfuron; Amitrole; ammonium sulfamate; Anilofos; Asulam; Asulam-sodium; Atrazine; Azafenidin; Azimsulfuron; Benazolin; Benazolin-ethyl; Benfluralin; Benfuresate; Benoxacor; Bensulfuron; Bensulfuron-methyl; Bensulide; Bentazone; Bentazone-sodium; Benofenap; Bifenox; Bilanofos; Bilanafos-sodium; Bispyribac-sodium; Borax; Bromacil; Bromobutide; Bromofenoxim; Bromoxynil; Bromoxynil-heptanoate; Bromoxynil-octanoate; Bromoxynil-potassium, Butachlor; Butamifos; Butralin; Butroxydim; butylate; Cafenstrole; Carbetamide; Carfentrazone-ethyl; Chlomethoxyfen; Chloramben; Chlorbromuron; Chloridazon; Chlorimuron; Chlorimuron-ethyl; Chloroacetic Acid; Chlorotoluron; Chlorpropham; Chlorsulfuron; Chlorthal; Chlorthal-dimethyl; Chlorthiamid; Cinmethylin; Cinosulfuron; Clethodim; Clodinafop; Clodinafop-Propargyl; Clomazone; Clomeprop; Clopyralid; Clopyralid-Olamine; Cloquintocet; Cloquintocet-Mexyl; Chloransulam-methyl; CPA; CPA-dimethylammonium; CPA-isoctyl; CPA-thioethyl; Cyanamide; Cyanazine; Cycloate; Cyclosulfamuron; Cycloxydim; Cyhalofop-butyl; Daimuron; Dalapon; Dalapon-sodium; Dazomet; Desmeduipham; Desmetryn; Dicamba; Dicamba-dimethylammonium; Dicamba-potassium; Dicamba-sodium; Dicamba-trolamine; Dichlobenil; Dichlormid; Dichlorprop; Dichlorprop-butotyl (Dichlorprop-butotyl (Dichlorpropbutoxyethyl ester)); Dichlorprop-dimethylammonium; Dichlorprop-isoctyl; Dichlorprop-P; Dichlorprop-potassium; Diclofop; Diclofop-methyl; Difenzoquat; Difenzoquat metilsulfate; Diflufenican; Diflufenzopyr (BAS 654 00 H); Dimefuron; Dimepiperate; Dimethachlor; Dimethametryn; Dimethenamid; Dimethipin; dimethylarsinic acid; Dinitramine; Dinoterb; Dinoterb acetate; Dinoterb-ammonium; Dinoterb-diolamine; Diphenamid; Diquat; Diquat dibromide; Dithiopyr; Diuron; DNOC; DSMA; Endothal; EPTC; Esprocarb; Ethalfluralin; Ethametsulfuron-methyl; Ethofumesate; Ethoxysulfuron; Etobenzanid;

Fenchlorazole-ethyl; Fenclorim; Fenoxaprop-P; Fenoxaprop-P-ethyl; Fenuron; Fenuron-TCA; Ferrous Sulfate; Flamprop-M; Flamprop-M-Isopropyl; Flamprop-M-methyl; Flazasulfuron; Fluazifop; Fluazifop-butyl; Fluazifop-P; Fluazifop-P-butyl; Fluazolate; Fluchloralin; Flufenacet (BAS FOE 5043); Flumetsulam; Flumiclorac; Flumiclorac-Pentyl; Flumioxazin; Fluometuron; Fluoroglycofen; Fluoroglycofen-ethyl; Flupaxam; Flupoxam; Flupropanate; Flupropanate-sodium; Flupyrsulfuron-methyl-sodium; Flurazole; Flurenol; Flurenol-butyl; Fluridone; Fluorochloridone; Fluoroxypyr; Fluoroxypyr-2-Butoxy-1-methylethyl; Fluoroxypyr-methyl; Flurtamone; Fluthioacet-methyl; Fluxofenim; Fomesafen; Fomesafen-sodium; Fosamine; Fosamine-ammonium; Furilazole; Glyphosate; Glufosinate; Glufosinate-ammonium; Glyphosate-ammonium; Glyphosate-isopropylammonium; Glyphosate-sodium; Glyphosate-trimesium; Halosulfuron; Halosulfuron-methyl; Haloxyfop; Haloxyfop-P-methyl; Haloxyfop-etotyl; Haloxyfop-methyl; Hexazinone; Hilanafos; Imazacluin; Imazamethabenz; Imazamox; Imazapyr; Imazapyr-isopropylammonium; Imazaquin; Imazaquin-ammonium; Imazemethabenz-methyl; Imazethapyr; Imazethapyr-ammonium; Imazosulfuron; Imizapic (AC 263,222); Indanofan; Ioxynil; Ioxynil octanoate; Ioxynil-sodium; Isoproturon; Isouron; Isoxaben; Isoxaflutole; Lactofen; Laxynel octanoate; Laxynil-sodium; Lenacil; Linuron; MCPA; MCPA-butotyl; MCPA-dimethylammonium; MCPA-isoctyl; MCPA-potassium; MCPA-sodium; MCPA-thioethyl; MCPB; MCPB-ethyl; MCPB-sodium; Mecoprop; Mecoprop-P; Mefenacet; Mefenpyrdiethyl; Mefluidide; Mesulfuron-methyl; Metam; Metamitron; Metam-sodium; Metezachlor; Methabenzthiazuron; methyl isothiocyanate; methylarsonic acid; Methyldymron; Metobenzuron; Metobromuron; Metolachlor; Metosulam; Metoxuron; Metribuzin; Metsulfuron; Molinate; Monolinuron; MPB-sodium; MSMA; Napropamide; Naptalam; Naptalam-sodium; Neburon; Nicosulfuron; nonanoic acid; Norflurazon; oleic acid (fatty acids); Orbencarb; Oryzalin; Oxabetrinil; Oxadiargyl; Oxasulfuron; Oxodiazon; Oxyfluorfen; Paraquat; Paraquat Dichloride; Pebulate; Pendimethalin; Pentachlorophenol; Pentachlorophenyl Laurate; Pentanochlor; Pentoxazone; petroleum oils; Phenmedipham; Picloram; Picloram-potassium; Piperophos; Pretilachlor; Primisulfuron; Primisulfuron-methyl; Prodiamine; Prometon; Prometryn; Propachlor; Propanil; Propaquizafop; Propazine; Propham; Propisochlor; Propyzamide; Prosulfocarb; Prosulfuron; Pyraflufen-ethyl; Pyrazasulfuron; Pyrazolynate; Pyrazosulfuron-ethyl; Pyrazoxyfen; Pyribenzoxim; Pyributicarb; Pyridate; Pyriminobac-methyl; Pyrithiobac-sodium; Quinclorac; Quinmerac; Quinofolamine; Quizalofop; Quizalofop-ethyl; Quizalofop-P; Quizalofop-P-ethyl; Quizalofop-P-Tefuryl; Rimsulfuron; Sethoxydim; Siduron; Silthiopham; Simazine; Simetryn; sodium chlorate; sodium chloroacetate; sodium pentachlorophenoxide; sodium-Dimethylarsinate; Sulcotrione; Sulfentrazone; Sulfometuron; Sulfometuron-methyl; Sulfosulfuron; Sulfuric acid; tars; TCA-sodium; Tebutam; Tebuthiuron; Tepraluxydim (BAS 620H); Terbacil; Terbumeton; Terbuthylazine; Terbutryn; Thenylchlor; Thiazopyr; Thifensulfuron; Thifensulfuron-methyl; Thiobencarb; Tiocarbazil; Tralkoxydim; triallate; Triasulfuron; Triaziflam; Tribenuron; Tribenuron-methyl; Tribenuron-methyl; trichloroacetic acid; Triclopyr; Triclopyr-butotyl; Triclopyr-triethylammonium; Trietazine; Trifluralin; Triflusulfuron; Triflusulfuron-methyl; Vernolate: YRC 2388; dichloropicolinic acid, aryloxyalkanoic acids; fluoroxypyr; MCPP; fluoroglycofen; halosafen; di-allate; terbutryne; aminotriazole; sulphonate; tridiphane; propoxycarbazone-sodium; 4-amino-n-(1,1-dimethylethyl)-4,5-dihydro-3-(1-methyl ethyl)-5-oxo-1H-1,2,4-triazole-1-carboxamide; and benzoic acid 2-((((4, 5-dihdydro-4-methyl-5-oxo-3-prop oxy-1H-1,2,4-triazol-1-yl)carbonyl)amino)sulfonyl)methyl ester.

Examples of suitable agricultural active ingredients also include, but are not limited to, bronopol, dichlorophen, nitrapyrin, octhilinone, furancarboxylic acid, oxytetracyclin, probenazole, and tecloftalam.

Additionally, suitable examples of agricultural active ingredients include, but are not limited to, ammonium sulfate; ammonium salts (such as ammonium chloride, or ammonium phosphates); nitrates (such as ammonium nitrate, calcium nitrate, sodium nitrate, or potassium nitrate); urea; substituted ureas (such as urea-aldehyde condensates or methylene ureas); inorganic phosphates (such as ammonium phosphate or potassium phosphate); potassium salts (such as potassium nitrate, potassium phosphate, potassium sulfate, or potassium chloride); and trace elements necessary for satisfactory crop growth (such as zinc, iron, copper, cobalt, molybdenum, and manganese). Trace elements may be present as their salts, or as anions such as molybdate or as a complex. For example, iron may be present as a complex with ethylenediamine tetraacetic acid.

Also, suitable examples of agricultural active ingredients include, but are not limited to, chlorcholine chloride and ethephon.

The agricultural active ingredient(s) selected will typically need to comport with a specific application need. Accordingly, the agricultural active ingredient(s) selected may be present in varying amounts, as well as in varying physical forms, such as solid particles, liquid, or semiliquid form. In some embodiments, the agricultural active ingredient(s) selected may be between 0 and 50% (by weight) of a composition described herein.

In some embodiments, Component (F) may be selected from Vitamin C, green tea extract, lidocaine, nicotine, niacinnamide, salicylic acid, ketoprofen, and ketoconazole.

In some embodiments, Component (F) may be selected from urea, ammonium nitrate, potassium nitrate, sodium nitrate, potassium phosphate, and ammonium phosphate.

Optional Component (G), Surfactant

According to some embodiments, at least one surfactant can optionally be added during treatment of hydrogels and hydrogel microparticles according to the methods described herein. In principle, the surfactant used can be any known surfactant and can be cationic, anionic, nonionic, and/or amphoteric. Furthermore, the surfactant can be aqueous, non-aqueous, and/or in diluted or undiluted form.

Examples of cationic surfactants include, but are not limited to, quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, and quaternary ammonium bases of benzimidazolines and poly(ethoxylated/propoxylated) amines.

Examples of anionic surfactants include, but are not limited to, alkyl sulfates such as lauryl sulfate, polymers such as acrylates/$C_{10-30}$ alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulfate esters of monoalkyl polyoxyethylene ethers; alkylnapthylsulfonic acid; alkali metal sulfoccinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulfates, ester sulfates, and alkarylsulfonates. Anionic surfactants include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

Examples of non-ionic surfactants include, but are not limited to, condensates of ethylene oxide with long chain fatty alcohols or fatty acids such as a C12-C16 alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain alkyl ether, polyoxyalkylene sorbitan ethers, polyoxyalkylene alkoxylate esters, polyoxyalkylene alkylphenol ethers, ethylene glycol propylene glycol copolymers and alkylpolysaccharides, polymeric surfactants such as polyvinyl alcohol (PVA) and polyvinylmethylether. In certain embodiments, the surfactant is a polyoxyethylene fatty alcohol or mixture of polyoxyethylene fatty alcohols. In other embodiments, the surfactant is an aqueous dispersion of a polyoxyethylene fatty alcohol or mixture of polyoxyethylene fatty alcohols.

Examples of amphoteric surfactants include cocamidopropyl betaine, cocamidopropyl hydroxysulfate, cocobetaine, sodium cocoamidoacetate, cocodimethyl betaine, N-coco-3-aminobutyric acid and imidazolinium carboxyl compounds.

In some embodiments, the surfactant is selected from Tergitol™ 15-s-3, Tergitol™ 15-s-40, sorbitan monooleate, polylycol-modified trimethsilylated silicate, polyglycol-modified siloxanes, polyglycol-modified silicas, ethoxylated quaternary ammonium salt solutions, and cetyltrimethylammonium chloride solutions.

Additional Optional Components

The provided compositions may optionally include additional components. Without limitation, examples of such optional additional components include surfactants; emulsifiers; dispersants; rheology modifiers such as thickeners; density modifiers; aziridine stabilizers; polymers; diluents; acid acceptors; antioxidants; heat stabilizers; flame retardants; scavenging agents; silylating agents; foam stabilizers; solvents; diluents; plasticizers; fillers and inorganic particles, pigments, dyes and dessicants.

Provided compositions may contain a number of optional components selected from those known in the state of the art to be ingredients in personal and healthcare formulations. Illustrative, non-limiting examples include surfactants, solvents, powders, coloring agents, thickeners, waxes, stabilizing agents, pH regulators, and silicones.

Thickening agents may optionally be added to the aqueous phase of the compositions to provide a convenient viscosity. For example, viscosities within the range of 500 to 25,000 mm$^2$/s at 25° C. or more, alternatively in the range of 3,000 to 7,000 mm$^2$/s at 25° C., are usually suitable.

Suitable thickening agents are exemplified by sodium alginate; gum arabic; polyoxyethylene; guar gum; hydroxypropyl guar gum; ethoxylated alcohols, such as laureth-4 or polyethylene glycol 400; cellulose derivatives exemplified by methylcellulose, methylhydroxypropylcellulose, hydroxypropylcellulose, polypropylhydroxyethylcellulose; starch and starch derivatives exemplified by hydroxyethylamylose and starch amylose; locust bean gum; electrolytes exemplified by sodium chloride and ammonium chloride; saccharides such as fructose and glucose; and derivatives of saccharides such as PEG-120, methyl glucose diolate; or mixtures of two or more of these. Alternatively the thickening agent is selected from cellulose derivatives, saccharide derivatives, and electrolytes, or from a combination of two or more of the above thickening agents exemplified by a combination of a cellulose derivative and any electrolyte, and a starch derivative and any electrolyte. The thickening agent may be present in shampoo compositions of the present invention in an amount sufficient to provide a viscosity in the final shampoo composition of from 500 to 25,000 mm$^2$/s. The thickening agent may be present in an amount from about 0.05 to 10 wt %; alternatively from about 0.05 to 5 wt %, based on the total weight of the composition. Thickeners based on acrylate derivatives, such as polyacrylate crosspolymer, Acrylates/C1030 Alkyl Acrylate crosspolymer, polyacrylamide derivatives, sodium polyacrylate may also be added.

Stabilizing agents may optionally be used in the water phase of the provided compositions. Suitable water phase stabilizing agents can include alone or in combination one or more electrolytes, polyols, alcohols such as ethyl alcohol, and hydrocolloids. Typical electrolytes are alkali metal salts and alkaline earth salts, especially the chloride, borate, citrate, and sulfate salts of sodium, potassium, calcium and magnesium, as well as aluminum chlorohydrate, and polyelectrolytes, especially hyaluronic acid and sodium hyaluronate. When the stabilizing agent is, or includes, an electrolyte, it amounts to about 0.1 to 5 wt % and more alternatively 0.5 to 3 wt % of the total composition. The hydrocolloids include gums, such as Xantham gum or Veegum and thickening agents, such as carboxymethyl cellulose. Polyols, such as glycerine, glycols, and sorbitols can also be used. Alternative polyols are glycerine, propylene glycol, sorbitol and butylene glycol. If a large amount of a polyol is used, one need not add the electrolyte. However, it is typical to use a combination of an electrolyte, a polyol and a hydrocolloid to stabilize the water phase, e.g. magnesium sulfate, butylene glycol and Xantham gum.

Other optional components can include powders and pigments. A powder composition can be generally defined as dry, particulate matter having a particle size of 0.02-50 microns. The particulate matter may be colored or non-colored (for example white). Suitable powders include, but are not limited to, bismuth oxychloride, titanated mica, fumed silica, spherical silica beads, polymethylmethacrylate beads, boron nitride, aluminum silicate, aluminum starch octenylsuccinate, bentonite, kaolin, magnesium aluminum silicate, silica, silica silylate, talc, mica, titanium dioxide, nylon, silk powder. The above-mentioned powders may be surface treated to render the particles hydrophobic in nature. The powder component also comprises various organic and inorganic pigments. The organic pigments are generally various aromatic types including azo, indigoid, triphenylmethane, anthraquinone, and xanthine dyes which are designated as D&C and FD&C blues, browns, greens, oranges, reds, yellows, etc. Inorganic pigments generally consist of insoluble metallic salts of certified color additives, referred to as the Lakes or iron oxides. A pulverulent coloring agent, such as carbon black, chromium or iron oxides, ultramarines, manganese pyrophosphate, iron blue, and titanium dioxide, pearlescent agents, generally used as a mixture with colored pigments, or some organic dyes, generally used as a mixture with colored pigments and commonly used in the cosmetics industry, can be added to the composition. In general, these coloring agents can be present in an amount by weight from 0 to 20% with respect to the weight of the final composition.

Pulverulent inorganic or organic fillers can also be added, generally in an amount by weight from 0 to 40% with respect to the weight of the final composition. These pulverulent fillers can be chosen from talc, micas, kaolin, zinc or titanium oxides, calcium or magnesium carbonates, silica, spherical titanium dioxide, glass or ceramic beads, metal soaps derived from carboxylic acids having 8-22 carbon atoms, non-expanded synthetic polymer powders, expanded powders and powders from natural organic compounds, such as cereal starches, which may or may not be cross-linked, copolymer microspheres such as EXPANCEL (Nobel Industrie), polytrap and silicone resin microbeads (TO-SPEARL from Toshiba, for example).

Waxes or wax-like materials may be optional components of the provided compositions, wherein such components generally have a melting point range of 35 to 120° C. at atmospheric pressure. Waxes in this category include synthetic wax, ceresin, paraffin, ozokerite, beeswax, carnauba, microcrystalline, lanolin, lanolin derivatives, candelilla, cocoa butter, shellac wax, spermaceti, bran wax, capok wax, sugar cane wax, montan wax, whale wax, bayberry wax, soy waxes or mixtures thereof. Mention may be made, among the waxes capable of being used as non-silicone fatty substances, of animal waxes, such as beeswax; vegetable waxes, such as carnauba, candelilla wax, mineral waxes, for example paraffin or lignite wax or microcrystalline waxes or ozokerites; synthetic waxes, including polyethylene waxes, and waxes obtained by the Fischer-Tropsch synthesis. Mention may be made, among the silicone waxes, of polymethylsiloxane alkyls, alkoxys and/or esters.

Water soluble or water dispersible silicone polyether compositions may also be optional components. These are also known as polyalkylene oxide silicone copolymers, silicone poly(oxyalkylene) copolymers, silicone glycol copolymers, or silicone surfactants. These can be linear rake or graft type materials, ABA or ABn type where the B is the siloxane polymer block, and the A is the poly(oxyalkylene) group. The poly(oxyalkylene) group can consist of polyethylene oxide, polypropylene oxide, or mixed polyethylene oxide/polypropylene oxide groups. Other oxides, such as butylene oxide or phenylene oxide are also possible.

Compositions according to embodiments of the present invention can be used in o/w, s/w, w/o, w/s, and non-aqueous o/o, o/s, and s/o emulsions or multiple phase emulsions using silicone emulsifiers. Typically the water-in-silicone emulsifier in such formulation is non-ionic and is selected from polyoxyalkylene-substituted silicones (rake or ABn type), silicone alkanolamides, silicone esters and silicone glycosides. Suitable silicone-based surfactants are well known in the art, and have been described for example in U.S. Pat. No. 4,122,029 (Gee et al.), U.S. Pat. No. 5,387,417 (Rentsch), and U.S. Pat. No. 5,811,487 (Schulz et al), JP 2001-294512.

Water-soluble solvents may also be optional components in the hydrogel. Examples include acetonitrile, tetrahydrofuran, acetone, 1,4-dioxane, dimethylsulfoxide.

When a provided composition is an oil-in-water emulsion, it will include common ingredients generally used for preparing emulsions such as but not limited to non ionic surfactants well known in the art to prepare o/w emulsions. Examples of nonionic surfactants include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, and polyoxyalkylene glycol modified polysiloxane surfactants.

A composition according to embodiments of the invention can also be under the form of aerosols in combination with propellant gases, such as carbon dioxide, nitrogen, nitrous oxide, volatile hydrocarbons such as butane, isobutane, or propane and chlorinated or fluorinated hydrocarbons such as dichlorodifluoromethane and dichlorotetrafluoroethane or dimethylether.

Surface-Modified Hydrogels and Hydrogel Microparticles

In various embodiments, provided are surface-modified hydrogels and hydrogel microparticles. Such hydrogels and microparticles are prepared by methods comprising treating a hydrogel or hydrogel microparticles comprising Component (A) with (i) Component (B); and (ii) Component (C), said treatment occurring in the presence of oxygen; wherein at least one modified surface is formed on the treated hydrogel or hydrogel microparticles.

In some embodiments, the amount of Component (B) used is dependent, in part, upon the nature and amount of Component (A) present in the hydrogel or microparticle, as well as the surface area of hydrogel or microparticle, and thickness of coating desired. While good results have been obtained with a ratio of Component (B)/Component (A) of from about 0.1/1 to about 3/1, one of skill in the art will appreciate that the ratios described herein are not limiting.

In some embodiments, the amount of Component (C) used is dependent upon a variety of factors. For example, the nature of Component (B), the water content of the gel or microparticle, the nature of the solvent present, the presence of a surfactant, and combinations thereof may be variables that affect the amount of Component (C) used in the provided methods. While good results have been obtained with a ratio of Component (C)/Component (B) of from about 0.1 to about 2, one of skill in the art will appreciate that the ratios described herein are not limiting.

In some embodiments, the untreated hydrogel or hydrogel microparticles comprise or are treated with Component (D). In some embodiments, Component (D) may be introduced (for example, by addition, exposure, contact, mixing, or combinations thereof) into the hydrogel or microparticles prior to treatment with Component (B), Component (C), or both. In some embodiments, Component (D) may be introduced after treatment with Component (B), Component (C), or both. In some embodiments, Component (D) may be introduced after, or in conjunction with, treatment/introduction of other components. For example, Component (D) may be introduced after treatment with one or more of Component (E); Component (F); or Component (G).

In some embodiments, the hydrogel or hydrogel microparticle (whether untreated, surface-modified, or both) optionally comprises or is optionally treated in the presence of Component (E). In some embodiments, the amount of Component (E) used is dependent, in part, upon the nature and amount of Component (C) present. While good results have been obtained with a molar ratio of Component (E)/ Component (C) of at least 1/1, one of skill in the art will appreciate that the ratios described herein are not limiting.

In some embodiments, the hydrogel or hydrogel microparticle (whether untreated, surface-modified, or both) optionally comprises or is optionally treated in the presence of Component (F). In some embodiments, the amount of Component (F) used is dependent, in part, upon its nature, its intended application, and amount needed to be beneficial. For example, in a personal or healthcare application, the amount of Component (F) used would be dependent, in part, upon the amount needed for beneficial delivery to the user.

In some embodiments, such hydrogels and hydrogel microparticles are prepared at temperatures from about 5° C. to about 95° C. Thus, temperature may be from about 5° C. to about 10° C., from about 10° C. to about 15° C., from about 15° C. to about 20° C., from about 20° C. to about 25° C., from about 25° C. to about 30° C., from about 30° C. to about 35° C., from about 35° C. to about 40° C., from about 40° C. to about 45° C., from about 45° C. to about 50° C., from about 50° C. to about 55° C., from about 55° C. to about 60° C., from about 60° C. to about 65° C., from about 65° C. to about 70° C., from about 70° C. to about 75° C., from about 75° C. to about 80° C., from about 80° C. to about 85° C., from about 85° C. to about 90° C., and from about 90° C. to about 95° C. In some embodiments, hydrogels and hydrogel microparticles may be prepared at temperatures from about 10° C. to about 35° C. Thus, the temperature may be 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., and 35° C.

In some embodiments, surface-modified hydrogels and hydrogel microparticles are prepared under acidic conditions. For example, treatment of a hydrogel or hydrogel microparticle may occur under conditions where pH is less than 7. Thus, pH may be from 1 to 2, from 2 to 3, from 3 to 4, from 4 to 5, from 5 to 6, or from 6 to 7.

In some embodiments, treatment of a hydrogels or hydrogel microparticle may occur in the presence of at least one water-immiscible solvent or other suitable solvent for Component (B). For example, treatment may occur in the presence of N-heptane.

In some embodiments, treatment of a hydrogels or hydrogel microparticle comprises removing any excess Component (B). This can be accomplished by any variety of common separation techniques such as rinsing or washing in a suitable solvent for Component (B), as described herein, filtration, evaporation, selective adsorption or absorption, centrifugation, and ultracentrifugation, combinations thereof.

In some embodiments, a polymer coating that resists solvent washing is formed on the surface of a hydrogel (for example, a gel slab or gel monolith) by the methods provided herein. The coating is formed on at least one surface and can serve as a barrier to the migration of water and/or alcohol into the hydrogel. The coating may also have time-release or delayed-release properties. In some embodiments, hydrogels having at least one hydrophobic surface are prepared according the methods provided herein.

In some embodiments, a polymer coating that resists solvent (water and/or alcohol) washing is formed on swollen hydrogel microparticles by the methods provided herein. The coating is formed on the surfaces of the microparticles and can serve as a barrier to the migration of water, alcohol and/or water-compatible compounds into or from the hydrogel microparticles. The coating may also have time-release or delayed-release properties. In some embodiments, hydrogel microparticles having hydrophobic surfaces are prepared according the methods provided herein.

In some embodiments, whether the resulting hydrogels or microparticles are solvent-compatible (dispersible) or solvent-resistant (i.e. permanently so) depending on the extent and nature of the coating that is formed. For example, coating thickness and cross-link density will be among the factors determining coating characteristics. In some embodiments, the coating formed on the surfaces of the hydrogels or microparticles can serve as a temporary barrier to the migration of water and water-compatible compounds. In some embodiments, the coating formed on the surfaces of the hydrogels or microparticles can serve as a permanent barrier to the migration of water and water-compatible compounds.

In some embodiments, microparticle prepared by the provided methods may have any shape (i.e., spherical or irregular) or size. The microparticles prepared may be formed directly or from the shearing or pulverizing of a gel monolith. Non-limiting examples of suitably sized microparticles include those having an average particle size of from about 0.1 μm to about 100 μm.

EXAMPLES

The present invention will be better understood by reference to the following examples which are offered by way of illustration and which one of skill in the art will recognize are not meant to be limiting.

Example 1

Method of Making a Polyacrylic Acid Hydrogel

Polyacrylic acid hydrogels were prepared under ambient laboratory conditions by the following method:
1. 30 parts DI water and 10 parts Acrylic Acid were manually shaken in a glass vial until uniform.
2. After shaking, 1 part TNBB-MOPA (tri-n-butyl borane complexed with 1.3 molar equivalents of 3-methoxypropyl amine) was added, and the sample was further mixed by manual shaking of the vial until the sample gelled. The compositions were observed to polymerize into non-flowable gels in less than 2 minutes.

Example 2

Silicone Surface-Modified Polyacrylic Acid Hydrogel Monolith

A hydrogel monolith with a surface coating of silicone was prepared at ambient lab conditions by the following method:
1. Hydrogel forming composition from Example 1 was poured into polystyrene weighing dishes before fully gelling. The material was then allowed to sit until fully gelled.
2. A mixture of 72 parts Hexamethyldisiloxane (used as a volatile solvent), 24 parts MA-PDMS (methacryloxypropyldimethylsiloxy terminated polydimethylsiloxane having a number average molecular weight of approximately 8,000 g/mol), and 4 parts TEB-PDA (triethyl borane-1,3-diamino propane complex) was prepared.
3. The surface of the hydrogel monolith was covered with the silicone mixture and allowed to sit for 10 minutes.
4. After 10 minutes, the excess mixture was decanted, and the monolith was rinsed with additional hexamethyldisiloxane followed by isopropyl alcohol (IPA) (Fisher histological grade) to remove any unreacted components.

After the sample was allowed to dry in air for two to three hours, there was visual evidence of a distinct surface layer. Testing of the surface by attenuated total reflectance infrared spectroscopy (ATR-IR) indicates that the surface of the hydrogel comprises silicone. Samples were analyzed with a Nicolet 6700 FTIR equipped with a Smart Miracle single bounce attenuated total internal reflectance infrared attachment (ATR-IR) equipped with a ZnSe crystal. The samples were placed directly in contact with the crystal with only minimum pressure to ensure complete contact with the crystal. Data were analyzed with Omnic 7.2 software.

The silicone surface-modified hydrogels of Example 2 have sharp peaks at 2962.2 cm$^{-1}$ and 1258.4 cm$^{-1}$ associated with PDMS. Sharp peaks at these wave numbers are not observed in the uncoated sample. Further, the uncoated sample shows a much larger, broad peak in the range of 3700-3000 cm$^{-1}$ that is attributed to water near the surface of the particle than what is observed in the silicone-coated hydrogel samples.

Example 3

Silicone Surface-Modified Polyacrylic Acid Hydrogel Monolith

The procedure used in Example 2 was repeated but with substitution of 50% and 75% MA-PDMS solutions in hexamethylsiloxane. Analysis by ATR-IR as described in Example 2 shows proportionately stronger PDMS peaks at 2962 cm$^{-1}$ and 1258 cm$^{-1}$ with increasing concentrations of MA-PDMS and weaker water peaks.

Example 4

Silicone Surface-Modified Partially Swollen Hydrogel Particles

Hydrogel particles with a silicone surface were prepared at ambient lab conditions by the following method:
1. 4.2 parts microparticulate crosslinked polyacrylic acid (RAA-1) [Carbopol® ETD 2020 (Acrylates/C10-30 Alkyl Acrylate Cross-Polymer particles], 12.7 parts MA-PDMS, and 0.6 part Sorbitan monooleate to 77.9 parts hexamethyldisiloxane were combined into an 8 oz. straight sided jar and stirred magnetically to achieve homogeniety.
2. 4.0 parts water were added drop wise while mixing and stirring was continued for a minimum of 10 minutes.
3. 0.7 parts TNBB-MOPA were added to the mixture and allowed to stir for a minimum of 15 minutes.
4. The resulting material was vacuum filtered through a 0.22 micron Teflon filter and rinsed with hexamethyldisiloxane and n-heptane.
5. The resulting material was dried for 2 hours at room temperature under full vacuum (<5 mm Hg).
6. The resulting material was added to deionized water to form a 1 wt % dispersion, which formed a gel in less than 1 hour at ambient lab temperature.

Samples were analyzed by scanning electron microscopy (SEM) and energy dispersive x-ray spectroscopy (EDS) using a JEOL JSM-6335 field emission scanning SEM and the Noran Vantage Microanalysis System on the JEOL JSM 6100 SEM. Coated samples appeared more bulbous in SEM images when compared to unprocessed Carbopol particles. Energy dispersive x-ray spectra (EDS) on the unprocessed particles showed only a trace level of elemental Si present (barely above the baseline and much lower than the O peak), whereas EDS on the silicone surface-modified hydrogel particles showed significant peaks associated with Si, comparable in magnitude to the O peak that are attributed to non-volatile PDMS surface modification that resists solvent washing.

Samples prepared by this method were also re-hydrated to 1% solids in $D_2O$ and tested by $^1H$ NMR. A Varian Mercury 300 MHz, FT-NMR Spectrometer, with a 5 mm switchable probe was used to perform $^1H$ NMR analyses of the samples. For surface-coated samples, signals at approximately 0 ppm were observed in the $^1H$ NMR spectrum, indicating the presence of methyl groups attached to silicon, as opposed to unprocessed samples that showed no signals in this region. This further confirms the existence of solvent-resistant (resists solvent washing), non-volatile PDMS on the hydrogel particles.

Example 5

Gelled Water Compositions Using Silicone Surface-Modified Hydrogel Particles

Continuous gelled water compositions were prepared at ambient lab conditions by the following method:
1. The silicone-modified hydrogel particles from Example 4 were dried in a vacuum oven at 30° C. and full vacuum for 2 hours.
2. 1 part dried silicone-modified particles was placed into a suitable glass vial along with 99 parts deionized water and the vial was placed on a wrist action shaker and removed periodically so that observations could be made.

It was found that the mixture became a flowable gel after about 15 minutes and became fully gelled at about 25 minutes. At the 25 minute mark there was still evidence of particles present. These particles were completely dispersed after a period of 16 hours.

Example 6

Water-Resistant Silicone Coating for monolithic hydrogel

A dyed hydrogel monolith was prepared as follows:
1. To 73 parts deionized water, a few drops of yellow food coloring and 24 parts acrylic acid were added in a glass vial. The vial was capped and shaken to make a homogeneous yellow solution.
2. 3 parts TNBB-MOPA were added to the mixture. The solution was capped and shaken vigorously for 3-4 seconds.
3. The contents of the vial were poured into two polystyrene weighing dishes and allowed to complete polymerization in the dishes to form a dyed hydrogel monolith.
4. The dyed hydrogel monolith was rinsed three times with hexamethyldisiloxane and three times with IPA then blown dry with compressed air.

A silicone-coated dyed hydrogel monolith was formed as follows:
1. 47 parts MA-PDMS, 47 parts hexamethyldisiloxane, and 6 parts TEB-PDA were mixed in a glass vial. The vial was capped and shaken manually until homogeneous.

2. The mixture was poured onto the surface of one of the cured yellow dyed hydrogel monoliths and formed a rapidly curing silicone coating on contact.

3. After 15 minutes, the excess silicone mixture was decanted from the hydrogel surface, then the gel was rinsed three times with hexamethyldisiloxane and three times more with IPA, then blown dry with compressed air.

Comparison of the surface-modified and unprocessed gel monoliths was undertaken as follows:

1. Three drops of water colored with blue food coloring was added to the center of the surface of both the silicone treated hydrogel monolith and the untreated hydrogel monolith.

2. After 95 minutes a tissue was used to blot the blue dyed water from the surface of the hydrogels.

For the untreated hydrogel monolith, it was observed that much of the blue coloring had migrated below the surface of the hydrogel into the sample, forming a green area indicating mixing of the two dyes. This confirms that the unmodified hydrogel is hygroscopic and water permeable.

For the silicone treated hydrogel monolith, it was observed that the blue water droplets remained on the surface with a high contact angle. Blotting the droplets with a Kimwipe caused the blue dye to be removed from the surface of the hydrogel with no trace of blue dye or green intermixed regions. This confirms that the hydrogel was effectively surface modified by the silicone and leads to a hydrophobic surface that significantly inhibits permeation of water. This also demonstrates that a cured silicone surface that resists solvent washing can be formed rapidly on a polyacrylic acid hydrogel monolith by a simple coating process at ambient conditions. It further demonstrates that the coating formed under such conditions can serve as a barrier, effectively blocking the migration of additional water into the hydrogel monolith.

Example 7

Silicone Surface-Modified Hydrogel Particles

Silicone surface-modified hydrogels particles were prepared as described in Example 4, wherein a hydrophobically modified microparticulate crosslinked polyacrylic acid copolymer (RAA-cp) [Carbopol® Ultrez 20 (Acrylates/C10-30 Alkyl Acrylate Cross-Polymer particles)] was substituted for µPAA-1. The surface-modified hydrogel particles gelled water in a manner similar to what is described in Example 5.

Example 8

Silicone Surface-Modified Hydrogel Particles

Silicone surface-modified hydrogels particles were prepared as described in Example 4, wherein a different grade of micropoarticulate crosslinked polyacrylic acid copolymer (pPAA-2) [Carbopol® ETD 2050 (Carbomer)] was substituted for µPAA-1. The surface-modified hydrogel particles gelled water in a manner similar to what is described in Example 5.

Example 9

Swollen Silicone Surface-Modified Hydrogel Particles

Silicone surface-modified hydrogel particles having a higher degree of swelling were prepared as described in Example 4, wherein the ratio of water to µPAA-1 was increased from 1:1 to 2:1 and 3:1.

Example 10

Silicone Surface-Modified Hydrogel Particles

The method of Example 4 was repeated but with substitution of a higher molecular weight version of MA-PDMS having identical structure but with number average molecular weight of 13,000 g/mol. The samples were then further hydrated using the method of Example 5 and found to gel water.

Example 11

Silicone Surface-Modified Hydrogel Particles

The method of Example 4 was repeated but with substitution of a higher molecular weight version of MA-PDMS having identical structure but with number average molecular weight of 36,000 g/mol. The samples were then further hydrated using the method of Example 5 and found to gel water.

Example 12

Rheological Testing of Modulus

Modulus measurements of various hydrogel samples at different hydration levels were obtained in frequency sweep mode using the parallel plate geometry on a Rheometrics Dynamic Analyzer RDA II rheometer. Moduli reported are the values of plateau modulus from the dynamic storage moduli (G') measured at 1% strain and a frequency of 10 rad/s. This value was selected as most representative of the plateau in G' that is associated with elastomeric materials. Higher consistency gels were recovered from the filter after washing and stamped out with a die matching either the 8 mm or 25 mm diameter plates. Sample thicknesses typically ranged between 1-3 mm. The lowest consistency samples (G'<$10^3$ Pa) were first diluted with deionized water to the corresponding dilution level, then pre-sheared without stamping on 40 mm diameter parallel plates and then trimmed to size with a Teflon spatula. Data gathered during the analysis were processed using TA Orchestrator Version V7.1.2.3. All tests were performed at room temperature.

Results are shown in Table 1 for samples made according to the methods described herein, with any adjustments noted. The final water:polyacrylic acid ratio as tested was achieved by adding any additional water as needed, prior to testing. The experimental scatter from replicates in the modulus measurements was found to be up to 30% for such soft materials.

These measurements demonstrate that the compositions of this invention yield materials that show a range of moduli as partially hydrated gels, as quantified by G' values. With unmodified µPAA-1, the samples do not gel and therefore exhibit no plateau in G'. Only upon neutralization do the samples gel water, yielding similar ranges of moduli. The similarity in G' for comparable water levels between the silicone-surface modified samples and processed controls, taken together with the spectroscopic evidence of silicone in the sample compositions, indicate that silicone surface modification can occur without significant deterioration of bulk properties.

TABLE 1

| Sample | Description | % TNBB-MOPA | % Silicone | TNBB-MOPA: Carbopol (w/w) | $H_2O$: Carbopol (w/w) | Plateau G' (PA) |
|---|---|---|---|---|---|---|
| A | μPAA-1 as received; pH 3.85 | 0.0 | 0.0 | 0.0 | 99.0 | n/a (no gel) |
| B | 95 parts of 1% μPAA-1 in $H_2O$ neutralized with 5 parts 0.1M KOH; pH 3.90 | 0.0 | 0.0 | 0.0 | 99.0 | 5.6E+01 |
| C | 95 parts of 1% μPAA-1 in H2O neutralized with 5 parts 0.1M KOH; pH 3.95 | 0.0 | 0.0 | 0.0 | 99.0 | 4.2E+02 |
| D | Hydrated and Processed μPAA-1; no silicone coating* | 0.7 | 0.0 | 0.15 | 1.0 | 5.3E+04 |
| E | Hydrated and Processed μPAA-1; no silicone coating* | 0.7 | 0.0 | 0.16 | 1.0 | 6.2E+04 |
| F | Silicone-modified μPAA-1 particles prepared according to Example 4 | 0.6 | 11.5 | 0.17 | 1.0 | 1.2E+05 |
| G | Silicone-modified μPAA-1 particles prepared according to Example 4 | 0.6 | 12.5 | 0.16 | 1.0 | 6.4E+04 |
| H | Silicone-modified μPAA-1 particles prepared according to Example 9 (initially 1:2 $H_2O$:ETD) | 0.7 | 12.8 | 0.16 | 0.5 | 8.3E+04 |
| I | Silicone-modified μPAA-1 particles prepared according to Example 9 (initially 2:1 $H_2O$:ETD) | 0.6 | 12.2 | 0.14 | 1.9 | 2.1E+04 |
| J | Silicone-modified μPAA-1 particles prepared according to Example 9 (initially 3:1 $H_2O$:ETD) | 0.6 | 12.0 | 0.17 | 3.0 | 1.1E+04 |
| K | Silicone-modified μPAA-1 particles prepared according to Example 10 | 0.7 | 12.5 | 0.17 | 1.0 | 2.0E+04 |
| L | Silicone-modified μPAA-1 particles prepared according to Example 11 | 0.7 | 12.7 | 0.16 | 0.9 | 4.9E+04 |
| M | Silicone-modified μPAA-1 particles prepared according to Example 11 (diluted to 1%) | 5.4 | 11.7 | 1.69 | 99.0 | 1.7E+02 |
| N | Silicone-modified μPAA-1 particles prepared according to Example 11 (diluted to 3%) | 5.4 | 11.7 | 1.69 | 97.0 | 5.7E+02 |
| O | Silicone-modified μPAA-1 particles prepared according to Example 11 (diluted to 5%) | 5.4 | 11.7 | 1.69 | 95.0 | 8.1E+02 |

*Processing was similar to that in Example 4: 5 parts μPAA-1, 1 part Sorbitan monoleate, 89 parts hexamethyldisiloxane were combined and mixed with a magnetic stirrer. 5 parts water were added drop wise while mixing then allowed to stir for a minimum of 10 minutes. 1 part TNBB-MOPA was added to the mixture and then allowed to continue mixing for a minimum of 15 minutes. The resulting material was vaccum filtered through a 0.22 micron Teflon filter and rinsed with hexamethyldisiloxane and n-heptane. The material was dried for 2 hours at room temperature under full vaccum (<5 mm Hg).

Example 13

Silicone Surface-Modified Partially Swollen Hydrogel Particles

Hydrogel particles with a silicone surface were prepared at ambient lab conditions by the following method:

1. 3.6 parts nonionic high molecular weight polyethylene oxide water soluble polymer (PEO) (Polyox™ WSR301 NF Grade), 11.5 parts MA-PDMS, and 1.8 part Sorbitan monooleate to 77.0 parts hexamethyldisiloxane were combined into an 8 oz. straight sided jar and mixed with a handheld homogenizer to achieve adequate mixing.

2. 5.6 parts of 3.7% Hydrochloric Acid in water were added drop wise while mixing.

3. 0.5 parts TNBB-MOPA were added to the mixture while mixing. Mixing was continued for 1 additional minute.

4. The resulting material was vacuum filtered through a 0.8 micron nylon filter and rinsed with hexamethyldisiloxane and n-heptane.

5. The resulting material was dried overnight at ambient lab conditions.

Analysis by ATR-IR as described in Example 2 shows proportionately stronger PDMS peaks at 2922 $cm^{-1}$ and 1251 $cm^{-1}$ with increasing concentrations of MA-PDMS and weaker water peaks.

Example 14

Silicone Surface-Modified Partially Swollen Hydrogel Particles

Hydrogel particles with a silicone surface were prepared at ambient lab conditions by the following method:

1. 5.7 parts MA-PDMS and 90.1 parts hexamethyldisiloxane and 3.2 parts of a mixture consisting of 4 Parts Sorbitan monooleate, 36.3 parts DI water, 18.7 parts Ethanol, 3.8 parts glacial Acetic Acid, and 37.1 parts partially hydroxypropyl-substituted methyl cellulose (Methocel E50) were combined into an 8 oz. straight sided jar and agitated with a hand-held lab homogenizer.

2. 1.1 parts TNBB-MOPA were added to the mixture. The mixture was homogenized for an additional minute.

3. The resulting material was vacuum filtered through a 5 micron nylon filter and rinsed with hexamethyldisiloxane and n-heptane.

4. The resulting material was dried for 2 hours at 40° C. under full vacuum (<5 mm Hg).

Analysis by EDS (LIMS 47689) and ESCA (LIMS 47684) indicate the presence of Si on the surface of the particle.

Example 15

Silicone Surface-Modified Partially Swollen Hydrogel Particles

Hydrogel particles with a silicone surface were prepared at ambient lab conditions by the following method:

1. 3.8 parts gelatin (Knox® Original Gelatine), 10.8 parts MA-PDMS, and 1.8 part Sorbitan monooleate to 79.9 parts hexamethyldisiloxane were combined into an 8 oz. straight sided jar and stirred magnetically to achieve homogeniety.

2. 3.3 parts of 5% glacial Acetic Acid in water were added drop wise while mixing and stirring was continued for a minimum of 10 minutes.

3. 0.5 parts TNBB-MOPA were added to the mixture and allowed to stir for a minimum of 15 minutes.

4. The resulting material was vacuum filtered through a 0.8 micron nylon filter and rinsed with hexamethyldisiloxane and n-heptane.

5. The resulting material was dried for 2 hours at 40° C. under full vacuum (<5 mm Hg).

The encapsulated particles are observed to form agglomerates unlike the very fine particles of neat gelatin. Analysis by ATR-IR as described in Example 2 shows a proportionately stronger PDMS peak at 2921 $cm^{-1}$ than the analysis of neat gelatin.

Example 16

Encapsulated active in Silicone Surface-Modified Partially Swollen Hydrogel Particles Hydrogel particles with a silicone surface were prepared at ambient lab conditions by the following method:

1. 6.5 parts μPAA-cp, 12.7 parts MA-PDMS, and 3.1 part Sorbitan monooleate to 70.0 parts hexamethyldisiloxane were combined into an 8 oz. straight sided jar and continually mixed using a magnetic stir plate.

2. 6.6 parts of a mixture consisting of 18 parts Lidocaine in 82 parts 3.7% Hydrochloric Acid in water were added drop wise while mixing.

3. 1.1 parts TNBB-MOPA were added to the mixture and allowed to mix for a minimum of 2 additional minutes.

4. The resulting material was vacuum filtered through a 0.8 micron Nylon filter and rinsed with hexamethyldisiloxane and n-heptane.

5. The resulting material was dried for 2 hours at 40° C. under full vacuum (<5 mm Hg).

Under observation with FE-SEM it appeared that the encapsulated □PAA-cp particles were more bulbous than the neat Carbopol particles. Further it was shown that the lidocaine was able to be extracted in significant concentrations (5-12 wt %) from the dried silicone surface-modified Carbopol particles as shown by analysis using a variety of ultra performance liquid chromatography (HPLC) methods, such as that outlined below:

1. 0.26 g of the dried resulting material from step 5 was extracted in 15 mL of 1N HCL by shaking for 1 hour at 50° C. on a wrist action shaker.

2. The solution was centrifuged for 10 min at 1500 rpm.

3. 1 mL of the supernatant was diluted to 10 mL in HPLC grade methanol and the sample filtered (0.45 micron syringe filter) and analyzed via a Waters Acquity HPLC (2.1×100 mm BEH C18 1.7 μam column with 30:70 Acetonitrile: 5% HOAc pH 3.4 (adjusted with 1N NaOH) mobile phase operating at a column temperature of 30° C. with a flow rate of 0.4 mL/min (Detection: PDA 254 nm).

The present invention should not be considered limited to the specific examples described herein, but rather should be understood to cover all embodiments of the invention. Various modifications and equivalent processes, as well as numerous structures and devices, to which the present invention may be applicable, will be readily apparent to those of skill in the art. Those skilled in the art will understand that various changes may be made without departing from the scope of the invention, which is not to be considered limited to what is described in the specification.

What is claimed is:

1. A method for the preparation of surface-modified hydrogels and hydrogel microparticles, comprising:
    treating in the presence of oxygen a hydrogel comprising
        Component (A), at least one water-compatible organic polymer, alcohol-compatible organic polymer, or any combination thereof, wherein Component (A) is selected from polyacrylic acid, poly(meth)acrylic acid, salts of polyacrylic acid, salts of polymethacrylicer lic anhydride, polyacrylic anhydride, and any combination thereof, with
        Component (B), at least one free-radical polymerizable organopolysiloxane that is immiscible with water, water-compatible alcohols, or combinations thereof, and that is selected from acrylate and methacrylate-functional polydimethylsiloxanes and acrylate and methacrylate-functional silanes,
        at least one suitable water-immiscible solvent for Component (B) selected from hexamethyldisiloxane, octamethyltrisiloxane, and decamethyltetrasiloxane, and
        Component (C), at least one organoborane free radical initiator;
    wherein
        the hydrogel is fully-or partially-swollen with an absorbable solvent selected from water, alcohols, and any combination thereof, prior to the treating with each of the Component (B), the at least one suitable solvent for Component (B), and the Component (C),
        the hydrogel is at least one of a non-flowable monolith, a sheared or pulverized monolith, and microparticles, and
        the treating forms at least one modified surface on the hydrogel or hydrogel microparticles.

2. The method according to claim 1, wherein Component (C) is selected from triethylborane-propanediamine, triethylborane-butylimidazole, triethylboranemethoxypropylamine, tri-n-butyl borane-methoxypropylamine, and triethylborane-aminosilane, triethylborane-aminosiloxane complexes, and any combination thereof.

3. The method according to claim 1, wherein the absorbable solvent is selected from water, methanol, ethanol, isopropyl alcohol, and any combination thereof.

4. The method according to claim 1, wherein the hydrogel is treated in the presence of Component (E), at least one organonitrogen-reactive compound.

5. The method according to claim 4, wherein Component (E) is selected from acids, anhydrides, isocyanates, epoxides, aldehydes, and any combination thereof.

6. The method according to claim 1, wherein the hydrogel comprises or is treated with Component (F), at least one active ingredient selected from personal care, healthcare, and agricultural active ingredients.

7. The method according to claim 6, wherein the active ingredient is selected from Vitamin C, green tea extract, lidocaine, nicotine, niacinnamide, salicylic acid, ketoprofen, ketoconazole, and urea.

8. The method according to claim 6, wherein the active ingredient is selected from urea, ammonium nitrate, potassium nitrate, sodium nitrate, potassium phosphate, and ammonium phosphate.

9. The method according to claim 1, wherein the hydrogel is treated in the presence of Component (G), at least one surfactant.

10. The method according to claim 9, wherein the surfactant is selected from sorbitan monooleate, polyglycol-modified trimethsilylated silicate, polyglycol-modified siloxanes, polyglycol-modified silicas, ethoxylated quaternary ammonium salt solutions, cetyltrimethylammonium chloride solutions, and any combination thereof.

11. Surface-modified hydrogels prepared by the method of claim 1.

12. Surface-modified hydrogel microparticles prepared by the method of claim 1.

13. Surface-modified hydrogels prepared by the method of claim 6.

14. Surface-modified hydrogel microparticles prepared by the method of claim 6.

15. The method according to claim 1, wherein Component (B) is selected from acryloxyalkyl-alkoxysilanes, methacryloxyalkyl-alkoxysilanes, acrylate-terminated polydimethylsiloxane, tetramethyl, dimethacryloxypropyl-disiloxane, 3-methacryloypropyltrimethoxysilane, methacryloxypropyldimethylsiloxy-terminated polydimethylsiloxane, methacryloxymethylsiloxy-terminated polydimethylsiloxanes, acryloxypropyldimethylsiloxy-terminated polydimethylsiloxanes, acryloxymethyldimethylsiloxy-terminated polydimethylsiloxanes, polydimethylsiloxanepolymethyl-methacryloxypropylsiloxane copolymers, polydimethylsiloxane-polymethylacryloxypropylsiloxane copolymers, and any combination thereof.

16. The method of claim 1, wherein the hydrogel is substantially free of external treatment with the absorbable solvent during the treating with each of the Component (B), the at least one suitable solvent for Component (B), and the Component (C).

17. A method for the preparation of surface-modified hydrogels and hydrogel microparticles, comprising:
   treating in the presence of oxygen a hydrogel comprising Component (A), at least one water-compatible organic polymer, alcohol-compatible organic polymer, or any combination thereof, wherein Component (A) is polyacrylic acid, with
   Component (B), at least one free-radical polymerizable organopolysiloxane that is immiscible with water, water-compatible alcohols, or combinations thereof, and that is a methacryloxypropyldimethylsiloxy-terminated polydimethylsiloxane,
   at least one suitable water-immiscible solvent for Component (B) that is hexamethyldisiloxane, and
   Component (C), at least one organoborane free radical initiator;
   wherein
   the hydrogel is fully-or partially-swollen with an absorbable solvent that is water prior to the treating with each of the Component (B), the at least one suitable solvent for Component (B), and the Component (C),
   the hydrogel is at least one of a non-flowable monolith, a sheared or pulverized monolith, and microparticles, and
   the treating forms at least one modified surface on the hydrogel or hydrogel microparticles.

18. The method of claim 17, wherein the hydrogel is substantially free of external treatment with the absorbable solvent during the treating with each of the Component (B), the at least one suitable solvent for Component (B), and the Component (C).

* * * * *

UNITED STATES PATENT AND TRADEMARK OFFICE
CERTIFICATE OF CORRECTION

PATENT NO. : 9,574,109 B2  
APPLICATION NO. : 13/579011  
DATED : February 21, 2017  
INVENTOR(S) : Dongchan Ahn et al.

Page 1 of 1

It is certified that error appears in the above-identified patent and that said Letters Patent is hereby corrected as shown below:

In the Claims

Column 38 under What is claimed is: in Line 35, the following "salts of polyacrylic acid, salts of polymethacryliccr lic" should be changed to [salts of polyacrylic acid, salts of polymethyacrylic].

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*